(12) United States Patent
Zheng et al.

(10) Patent No.: US 9,187,639 B2
(45) Date of Patent: Nov. 17, 2015

(54) THERMAL PLASTIC BLENDS WITH IMPROVED IMPACT STRENGTH AND FLOW

(71) Applicant: SABIC Global Technologies B.V., Bergen op Zoom (NL)

(72) Inventors: Yun Zheng, Shanghai (CN); Shijie Song, Shanghai (CN)

(73) Assignee: SABIC Global Technologies B.V., Bergen op Zoom (NL)

(*) Notice: Subject to any disclaimer, the term of this patent is extended or adjusted under 35 U.S.C. 154(b) by 0 days.

(21) Appl. No.: 14/295,894

(22) Filed: Jun. 4, 2014

(65) Prior Publication Data

US 2014/0357769 A1    Dec. 4, 2014

Related U.S. Application Data

(60) Provisional application No. 61/830,947, filed on Jun. 4, 2013.

(51) Int. Cl.
  *C08L 69/00*    (2006.01)
  *C08K 3/00*    (2006.01)
  *C08K 7/14*    (2006.01)

(52) U.S. Cl.
  CPC ............ *C08L 69/00* (2013.01); *C08K 3/0033* (2013.01); *C08K 7/14* (2013.01); *C08L 2666/18* (2013.01)

(58) Field of Classification Search
  USPC ......... 524/127, 130, 138, 140, 141, 147, 151, 524/494
  See application file for complete search history.

(56) References Cited

U.S. PATENT DOCUMENTS

| | | | |
|---|---|---|---|
| 4,154,775 A | 5/1979 | Axelrod | |
| 4,217,438 A | 8/1980 | Brunelle et al. | |
| 4,358,556 A | 11/1982 | Van Abeelen | |
| 4,746,701 A | 5/1988 | Kress et al. | |
| 4,749,738 A | 6/1988 | Boutni | |
| 5,326,793 A | 7/1994 | Gallucci et al. | |
| 5,728,765 A | 3/1998 | Chung et al. | |
| 5,852,098 A | 12/1998 | Kohler et al. | |
| 6,969,745 B1* | 11/2005 | Taraiya et al. | 525/439 |
| 7,786,246 B2 | 8/2010 | Jansen et al. | |
| 8,017,697 B2 | 9/2011 | Carrillo et al. | |
| 8,299,150 B2 | 10/2012 | Nagatoshi et al. | |
| 2002/0099128 A1* | 7/2002 | Patel et al. | 524/494 |
| 2006/0131928 A1* | 6/2006 | Onizawa et al. | 296/146.15 |
| 2007/0161738 A1* | 7/2007 | Chung et al. | 524/447 |
| 2007/0197722 A1* | 8/2007 | Li et al. | 525/67 |
| 2009/0088514 A1* | 4/2009 | Shiping | 524/451 |
| 2012/0022190 A1 | 1/2012 | Nagano et al. | |
| 2012/0108729 A1 | 5/2012 | Lyons et al. | |
| 2012/0289655 A1* | 11/2012 | Sumita et al. | 525/67 |
| 2013/0317141 A1* | 11/2013 | Cheng et al. | 524/116 |

FOREIGN PATENT DOCUMENTS

| | | | |
|---|---|---|---|
| JP | 10-158498 | * | 6/1998 |
| JP | 10237293 | | 9/1998 |
| JP | 2004/010712 | | 1/2004 |
| WO | WO 03/066704 | | 8/2003 |
| WO | WO 2011/027780 | | 3/2011 |
| WO | WO 2011087141 A1 | * | 7/2011 |
| WO | WO2012058821 A1 | * | 5/2012 |

* cited by examiner

*Primary Examiner* — Randy Gulakowski
*Assistant Examiner* — Christopher M Rodd
(74) *Attorney, Agent, or Firm* — Baker Hostetler LLP

(57) ABSTRACT

Disclosed herein are blended thermoplastic compositions comprising at least one polycarbonate polymer, at least one polyester polymer, and at least one reinforcing filler. The thermal blended polycarbonate compositions can optionally further comprise at least one polycarbonate-polysiloxane copolymer, at least one impact modifier polymer, and/or at least one flame retardant. The resulting compositions can be used in the manufacture of articles requiring materials with high modulus and high flowability, while retaining good impact strength. This abstract is intended as a scanning tool for purposes of searching in the particular art and is not intended to be limiting of the present disclosure.

34 Claims, No Drawings

THERMAL PLASTIC BLENDS WITH IMPROVED IMPACT STRENGTH AND FLOW

CROSS REFERENCE TO RELATED PATENT APPLICATION

This application claims priority to U.S. Patent Application No. 61/830,947 filed Jun. 4, 2013, herein incorporated by reference in its entirety.

BACKGROUND

The main trend of design in consumer electronic applications, e.g. notebook, tablet and smart phone devices, is to reduce the thickness and extend the visual screen to the largest extent feasible. Therefore, high modulus materials with good ductility are needed for components of these devices such as the housing or internal support. Blended polycarbonate polymer composites are typically used materials in the consumer electronic industry due the excellent processing and low cost. In consumer electronic industry, polycarbonate is a widely used thermal plastic (e.g., thermoplastic) for different applications.

In some applications requiring high stiffness, the most effective way to elevate modulus in blended polycarbonate compositions is to incorporate glass fiber or carbon fiber into polycarbonate, with glass fiber being more cost-effective than carbon fiber. However, glass fiber generally lowers the ductility and flowability, especially when the fiber loading is high, of blended polycarbonate compositions. To compensate the loss of ductility, current approaches typically introduce certain impact modifier such as MBS, acrylate block copolymer. Unfortunately, such elastomer based impact modifiers lower the modulus and flowability, or seriously degrade the flame retardancy rating.

Thus, there remains a need for blended thermoplastic compositions that effectively balance the modulus, impact and flowability properties.

SUMMARY

The present disclosure relates to blended thermoplastic compositions comprising at least one polycarbonate polymer, at least one polyester polymer, at least one reinforcing filler, an optional polycarbonate-polysiloxane polymer, and an optional flame retardant. The resulting compositions can be used in the manufacture of articles requiring materials high modulus and flowability, while retaining impact strength.

In one aspect, the disclosure relates to blended thermoplastic compositions comprising: (a) from about 30 wt % to about 75 wt % of a polycarbonate polymer; (b) from about 1 wt % to about 20 wt % of a polyester polymer; and (c) from about 25 wt % to about 60 wt % of a reinforcing filler; wherein the combined weight percent value of all components does not exceed about 100 wt %; and wherein all weight percent values are based on the total weight of the composition.

In various further aspects, the disclosure relates to articles comprising the disclosed compositions.

In a further aspect, the disclosure relates to methods of making the disclosed compositions.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

The present disclosure can be understood more readily by reference to the following detailed description of the disclosure and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate poly" includes mixtures of two or more polycarbonate polymers.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

As used herein, the term "effective amount" refers to an amount that is sufficient to achieve the desired modification of a physical property of the composition or material. For example, an "effective amount" of a reinforcing filler refers to an amount that is sufficient to achieve the desired improvement in the property modulated by the formulation component, e.g. achieving the desired level of modulus. The specific level in terms of wt % in a composition required as an effective amount will depend upon a variety of factors including the amount and type of polycarbonate, amount and type of polycarbonate, amount and type of thermally conductive filler, and end use of the article made using the composition.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

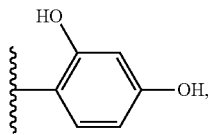 [SMILES: *c1ccc(O)cc1O]

regardless of whether 2,4-dihydroxyphenyl is used to prepare the compound. In some embodiments the radical (for example an alkyl) can be further modified (i.e., substituted alkyl) by having bonded thereto one or more "substituent radicals." The number of atoms in a given radical is not critical to the present disclosure unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

As used herein, the terms "number average molecular weight" or "$M_n$" can be used interchangeably, and refer to the statistical average molecular weight of all the polymer chains in the sample and is defined by the formula:

$$M_n = \frac{\Sigma N_i M_i}{\Sigma N_i},$$

$$M_n = \frac{\Sigma N_i M_i}{\Sigma N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

$$M_n = \frac{\Sigma N_i M_i}{\Sigma N_i}.$$

As used herein, the terms "weight average molecular weight" or "Mw" can be used interchangeably, and are defined by the formula:

$$M_w = \frac{\Sigma N_i M_i^2}{\Sigma N_i M_i},$$

where $M_i$ is the molecular weight of a chain and $N_i$ is the number of chains of that molecular weight. Compared to $M_i$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "BisA," "BPA," or "bisphenol A," which can be used interchangeably, as used herein refers to a compound having a structure represented by the formula:

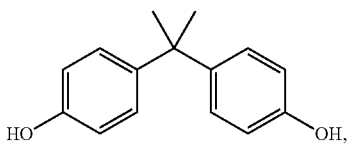

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

As used herein in reference to concentrations of components, the phrase "substantially the same proportions" can mean within a range of +/- about 1 wt % of the subject concentration(s).

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Blended Thermoplastic Polymer Compositions

As briefly described above, the present disclosure relates to blended thermoplastic compositions comprising at least one polycarbonate polymer, at least one polyester polymer, and at least one reinforcing filler. In various aspects, the disclosed blended thermoplastic compositions can optionally further comprise a polycarbonate-polysiloxane polymer. In various further aspects, the disclosed blended thermoplastic compositions can optionally further comprise an impact modifier. In a further aspect, the disclosed blended thermoplastic compositions can optionally further comprise a flame retardant. The resulting compositions can be used in the manufacture of articles requiring materials with high modulus and high flowability, while retaining good impact strength.

In one aspect, the disclosure relates to blended thermoplastic compositions comprising: (a) from about 30 wt % to about 75 wt % of a polycarbonate polymer; (b) from about 1 wt % to about 20 wt % of a polyester polymer; and (c) from about 25 wt % to about 60 wt % of a reinforcing filler; wherein the combined weight percent value of all components does not exceed about 100 wt %; and wherein all weight percent values are based on the total weight of the composition.

In one aspect, the disclosure relates to blended thermoplastic compositions comprising: (a) from about 45 wt % to about 70 wt % of a polycarbonate polymer; (b) from about 3 wt % to about 15 wt % of a polyester polymer; and (c) from about 30 wt % to about 55 wt % of a reinforcing filler; wherein the combined weight percent value of all components does not exceed about 100 wt %; and wherein all weight percent values are based on the total weight of the composition.

In one aspect, the disclosure relates to blended thermoplastic compositions comprising: (a) from about 50 wt % to about 70 wt % of a polycarbonate polymer; (b) from about 3 wt % to about 10 wt % of a polyester polymer; and (c) from about 30 wt % to about 50 wt % of a reinforcing filler; wherein the combined weight percent value of all components does not exceed about 100 wt %; and wherein all weight percent values are based on the total weight of the composition.

In various aspects, the blended thermoplastic compositions optionally further comprise from about 0.1 wt % to about 15 wt % of a polycarbonate-polysiloxane copolymer. In a further aspect, the blended thermoplastic compositions optionally do not comprise a polycarbonate-polysiloxane copolymer.

In various aspects, the blended thermoplastic compositions optionally further comprise from about 1 wt % to about 10 wt % of an impact modifier polymer. In a further aspect, the blended thermoplastic compositions optionally do not comprise an impact modifier polymer.

In various aspects, the blended thermoplastic compositions optionally further comprise from about 1 wt % to about 15 wt % of a flame retardant. In a further aspect, the blended thermoplastic compositions optionally do not comprise a flame retardant.

In one aspect, the disclosure relates to blended thermoplastic compositions comprising: (a) from about 30 wt % to about 75 wt % of a polycarbonate polymer; (b) from about 1 wt % to about 20 wt % of a polyester polymer; (c) from about 25 wt % to about 60 wt % of a reinforcing filler; and (d) from about 1 wt % to about 15 wt % of a flame retardant; wherein the combined weight percent value of all components does not exceed about 100 wt %; and wherein all weight percent values are based on the total weight of the composition.

In one aspect, the disclosure relates to blended thermoplastic compositions comprising: (a) from about 40 wt % to about 70 wt % of a polycarbonate polymer; (b) from about 3 wt % to about 15 wt % of at least one polyester polymer; (c) from about 30 wt % to about 55 wt % of at least one reinforcing filler; and (d) from about 4 wt % to about 12 wt % of at least one flame retardant; wherein the combined weight percent value of all components does not exceed about 100 wt %; and wherein all weight percent values are based on the total weight of the composition.

In one aspect, the disclosure relates to blended thermoplastic compositions comprising: (a) from about 50 wt % to about 70 wt % of a polycarbonate polymer; (b) from about 3 wt % to about 10 wt % of at least one polyester polymer; (c) from about 30 wt % to about 50 wt % of at least one reinforcing filler; and (d) from about 6 wt % to about 10 wt % of at least one flame retardant; wherein the combined weight percent value of all components does not exceed about 100 wt %; and wherein all weight percent values are based on the total weight of the composition.

In one aspect, the disclosure relates to blended thermoplastic compositions comprising: (a) from about 30 wt % to about 75 wt % of a polycarbonate polymer; (b) from about 1 wt % to about 20 wt % of at least one polyester polymer; (c) from about 25 wt % to about 60 wt % of at least one reinforcing filler; (d) from about 4 wt % to about 12 wt % of at least one flame retardant; and (e) from about 5 wt % to about 10 wt % of a polycarbonate-polysiloxane polymer; wherein the combined weight percent value of all components does not exceed about 100 wt %; and wherein all weight percent values are based on the total weight of the composition.

In one aspect, the disclosure relates to blended thermoplastic compositions comprising: (a) from about 45 wt % to about 70 wt % of a polycarbonate polymer; (b) from about 3 wt % to about 15 wt % of at least one polyester polymer; (c) from about 30 wt % to about 55 wt % of at least one reinforcing filler; (d) from about 4 wt % to about 12 wt % of at least one flame retardant; and (e) from about 5 wt % to about 10 wt % of a polycarbonate-polysiloxane polymer; wherein the combined weight percent value of all components does not exceed about 100 wt %; and wherein all weight percent values are based on the total weight of the composition.

In one aspect, the disclosure relates to blended thermoplastic compositions comprising: (a) from about 50 wt % to about 70 wt % of a polycarbonate polymer; (b) from about 3 wt % to about 10 wt % of at least one polyester polymer; (c) from about 30 wt % to about 50 wt % of at least one reinforcing filler; (d) from about 6 wt % to about 10 wt % of at least one flame retardant; and (e) from about 6 wt % to about 10 wt % of a polycarbonate-polysiloxane polymer; wherein the combined weight percent value of all components does not exceed about 100 wt %; and wherein all weight percent values are based on the total weight of the composition.

In one aspect, the disclosure relates to blended thermoplastic compositions comprising: (a) from about 30 wt % to about 75 wt % of a polycarbonate polymer; (b) from about 1 wt % to about 20 wt % of a polyester polymer; (c) from about 25 wt % to about 60 wt % of a reinforcing filler; (d) from about 1 wt % to about 15 wt % of a flame retardant; and (e) from about 1 wt % to about 15 wt % of an impact modifier polymer; wherein the combined weight percent value of all components does not exceed about 100 wt %; and wherein all weight percent values are based on the total weight of the composition.

In one aspect, the disclosure relates to blended thermoplastic compositions comprising: (a) from about 45 wt % to about 70 wt % of a polycarbonate polymer; (b) from about 3 wt % to about 15 wt % of at least one polyester polymer; (c) from about 30 wt % to about 55 wt % of at least one reinforcing filler; (d) from about 4 wt % to about 12 wt % of at least one flame retardant; and (e) from about 5 wt % to about 10 wt % of an impact modifier polymer; wherein the combined weight percent value of all components does not exceed about 100 wt %; and wherein all weight percent values are based on the total weight of the composition.

In one aspect, the disclosure relates to blended thermoplastic compositions comprising: (a) from about 50 wt % to about 70 wt % of a polycarbonate polymer; (b) from about 3 wt % to about 10 wt % of at least one polyester polymer; (c) from about 30 wt % to about 50 wt % of at least one reinforcing filler; (d) from about 6 wt % to about 10 wt % of at least one flame retardant; and (e) from about 6 wt % to about 10 wt % of an impact modifier polymer; wherein the combined weight percent value of all components does not exceed about 100 wt %; and wherein all weight percent values are based on the total weight of the composition.

In one aspect, the disclosure relates to blended thermoplastic compositions comprising: (a) from about 30 wt % to about 75 wt % of a polycarbonate polymer; (b) from about 1 wt % to about 20 wt % of a polyester polymer; and (c) from about 25 wt % to about 60 wt % of a reinforcing filler; wherein the combined weight percent value of all components does not exceed about 100 wt %; and wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In one aspect, the disclosure relates to blended thermoplastic compositions comprising: (a) from about 45 wt % to about 70 wt % of a polycarbonate polymer; (b) from about 3 wt % to about 15 wt % of a polyester polymer; and (c) from about 30 wt % to about 55 wt % of a reinforcing filler; wherein the combined weight percent value of all components does not exceed about 100 wt %; and wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In one aspect, the disclosure relates to blended thermoplastic compositions comprising: (a) from about 50 wt % to about 70 wt % of a polycarbonate polymer; (b) from about 3 wt % to about 10 wt % of a polyester polymer; and (c) from about 30 wt % to about 50 wt % of a reinforcing filler; wherein the combined weight percent value of all components does not exceed about 100 wt %; and wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In one aspect, the disclosure relates to blended thermoplastic compositions comprising: (a) from about 30 wt % to about 75 wt % of a polycarbonate polymer; (b) from about 1 wt % to about 20 wt % of a polyester polymer; (c) from about 25 wt % to about 60 wt % of a reinforcing filler; and (d) from about 1 wt % to about 15 wt % of a flame retardant; wherein the combined weight percent value of all components does not exceed about 100 wt %; wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In one aspect, the disclosure relates to blended thermoplastic compositions comprising: (a) from about 40 wt % to about 70 wt % of a polycarbonate polymer; (b) from about 3 wt % to about 15 wt % of at least one polyester polymer; (c) from about 30 wt % to about 55 wt % of at least one reinforcing filler; and (d) from about 4 wt % to about 12 wt % of at least one flame retardant; wherein the combined weight percent value of all components does not exceed about 100 wt %; wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In one aspect, the disclosure relates to blended thermoplastic compositions comprising: (a) from about 50 wt % to about 70 wt % of a polycarbonate polymer; (b) from about 3 wt % to about 10 wt % of at least one polyester polymer; (c) from about 30 wt % to about 50 wt % of at least one reinforcing filler; and (d) from about 6 wt % to about 10 wt % of at least one flame retardant; wherein the combined weight percent value of all components does not exceed about 100 wt %; wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In one aspect, the disclosure relates to blended thermoplastic compositions comprising: (a) from about 30 wt % to about 75 wt % of a polycarbonate polymer; (b) from about 1 wt % to about 20 wt % of a polyester polymer; (c) from about 25 wt % to about 60 wt % of a reinforcing filler; (d) from about 1 wt % to about 15 wt % of a flame retardant; and (e) from about 1 wt % to about 15 wt % of a polycarbonate-polysiloxane polymer; wherein the combined weight percent value of all components does not exceed about 100 wt %; wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In one aspect, the disclosure relates to blended thermoplastic compositions comprising: (a) from about 40 wt % to about 70 wt % of a polycarbonate polymer; (b) from about 3 wt % to about 15 wt % of at least one polyester polymer; (c) from about 30 wt % to about 55 wt % of at least one reinforcing filler; (d) from about 4 wt % to about 12 wt % of at least one flame retardant; and (e) from about 5 wt % to about 10 wt % of a polycarbonate-polysiloxane polymer; wherein the combined weight percent value of all components does not exceed about 100 wt %; wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In one aspect, the disclosure relates to blended thermoplastic compositions comprising: (a) from about 50 wt % to about 70 wt % of a polycarbonate polymer; (b) from about 3 wt % to about 10 wt % of at least one polyester polymer; (c) from about 30 wt % to about 50 wt % of at least one reinforcing filler; (d) from about 6 wt % to about 10 wt % of at least one flame retardant; and (e) from about 6 wt % to about 10 wt % of a polycarbonate-polysiloxane polymer; wherein the combined weight percent value of all components does not exceed about 100 wt %; wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In one aspect, the disclosure relates to blended thermoplastic compositions comprising: (a) from about 30 wt % to about 75 wt % of a polycarbonate polymer; (b) from about 1 wt % to about 20 wt % of a polyester polymer; (c) from about 25 wt % to about 60 wt % of a reinforcing filler; (d) from about 1 wt % to about 15 wt % of a flame retardant; and (e) from about 1 wt % to about 15 wt % of an impact modifier polymer; wherein the combined weight percent value of all components does not exceed about 100 wt %; wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In one aspect, the disclosure relates to blended thermoplastic compositions comprising: (a) from about 40 wt % to about 70 wt % of a polycarbonate polymer; (b) from about 3 wt % to about 15 wt % of at least one polyester polymer; (c) from about 30 wt % to about 55 wt % of at least one reinforcing filler; (d) from about 4 wt % to about 12 wt % of at least one flame retardant; and (e) from about 5 wt % to about 10 wt % of an impact modifier polymer; wherein the combined weight percent value of all components does not exceed about 100 wt %; wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In one aspect, the disclosure relates to blended thermoplastic compositions comprising: (a) from about 50 wt % to about 70 wt % of a polycarbonate polymer; (b) from about 3 wt % to about 10 wt % of at least one polyester polymer; (c) from about 30 wt % to about 50 wt % of at least one reinforcing filler; (d) from about 6 wt % to about 10 wt % of at least one flame retardant; and (e) from about 6 wt % to about 10 wt % of an impact modifier polymer; wherein the combined weight percent value of all components does not exceed about 100 wt %; wherein all weight percent values are based on the total weight of the composition; wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

In various aspects, the compositions of the present disclosure further comprise an additive selected from coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, and combinations of two or more of the foregoing. In a further aspect, compositions of the present disclosure further comprise at least one additive selected from a flame retardant, a colorant, a primary anti-oxidant, and a secondary anti-oxidant.

In various aspects, the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer. In a further aspect, the blended thermoplastic composition has a melt volume rate (MVR) when determined in accordance with ASTM 1238 at 300° C. under a load of 1.2 kg of at least about 15% greater than a reference composition comprising or consisting essentially of substantially the same proportions of the same polycarbonate polymer component and the same reinforcing fiber, in the absence of the polyester polymer. In a still further aspect, the blended thermoplastic composition has a melt volume rate (MVR) when determined in accordance with ASTM 1238 at 300° C. under a load of 1.2 kg of at least about 20% greater than a reference composition comprising or consisting essentially of substantially the same proportions of the same polycarbonate polymer component and the same reinforcing fiber, in the absence of the polyester polymer. In yet a further aspect, the blended thermoplastic composition has a melt volume rate (MVR) when determined in accordance with ASTM 1238 at 300° C. under a load of 1.2 kg of at least about 25% greater than a reference composition comprising or consisting essentially of substantially the same proportions of the same polycarbonate polymer component and the same reinforcing fiber, in the absence of the polyester polymer. In an even further aspect, the blended thermoplastic composition has a melt volume rate (MVR) when determined in accordance with ASTM 1238 at 300° C. under a load of 1.2 kg of at least about 30% greater than a reference composition comprising or consisting essentially of substantially the same proportions of the same polycarbonate polymer component and the same reinforcing fiber, in the absence of the polyester polymer. In a still further aspect, the blended thermoplastic composition has a melt volume rate (MVR) when determined in accordance with ASTM 1238 at 300° C. under a load of 1.2 kg of at least about 40% greater than a reference composition comprising or consisting essentially of substantially the same proportions of the same polycarbonate polymer component and the same reinforcing fiber, in the absence of the polyester polymer. In yet a further aspect, the blended thermoplastic composition has a melt volume rate (MVR) when determined in accordance with ASTM 1238 at 300° C. under a load of 1.2 kg of at least about 50% greater than a reference composition comprising or consisting essentially of substantially the same proportions of the same polycarbonate polymer component and the same reinforcing fiber, in the absence of the polyester polymer.

In various aspects, a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer. In a further aspect, a molded sample of the blended thermoplastic composition has an unnotched Izod impact strength when determined in accordance with ASTM D4812 of at least about 20% greater than a reference composition comprising or consisting essentially of substantially the same proportions of the same polycarbonate polymer component and the same reinforcing fiber, in the absence of the polyester polymer. In a still further aspect, a molded sample of the blended thermoplastic composition has an unnotched Izod impact strength when determined in accordance with ASTM D4812 of at least about 25% greater than a reference composition comprising or consisting essentially of substantially the same proportions of the same polycarbonate polymer component and the same reinforcing fiber, in the absence of the polyester polymer. In yet a further aspect, a molded sample of the blended thermoplastic composition has an unnotched Izod impact strength when determined in accordance with ASTM D4812 of at least about 30% greater than a reference composition comprising or consisting essentially of substantially the same proportions of the same polycarbonate polymer component and the same reinforcing fiber, in the absence of the polyester polymer. In an even further aspect, a molded sample of the blended thermoplastic composition has an unnotched Izod impact strength when determined in accordance with ASTM D4812 of at least about 40% greater than a reference composition comprising or consisting essentially of substantially the same proportions of the same polycarbonate polymer component and the same reinforcing fiber, in the absence of the polyester polymer. In a still further aspect, a molded sample of the blended thermoplastic composition has an unnotched Izod impact strength when determined in accordance with ASTM D4812 of at least about 50% greater than a reference composition comprising or consisting essentially of substantially the same proportions of the same polycarbonate polymer component and the same reinforcing fiber, in the absence of the polyester polymer.

Polycarbonate Polymer Component

In one aspect, the disclosed blended thermoplastic compositions comprise a polycarbonate polymer composition wherein the polycarbonate polymer comprising bisphenol A, a polycarbonate copolymer, polyester carbonate polymer, or polycarbonate-polysiloxane copolymer, or combinations thereof.

In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods. The term polycarbonate can be further defined as compositions have repeating structural units of the formula (1):

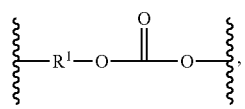

(1)

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

$$-A^1-Y^1-A^2- \quad (2),$$

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

In a further aspect, polycarbonates can be produced by the interfacial reaction of dihydroxy compounds having the formula HO—$R^1$—OH, which includes dihydroxy compounds of formula (3):

$$HO-A^1-Y^1-A^2-OH \quad (3),$$

wherein $Y^1$, $A^1$ and $A^2$ are as described above. Also included are bisphenol compounds of general formula (4):

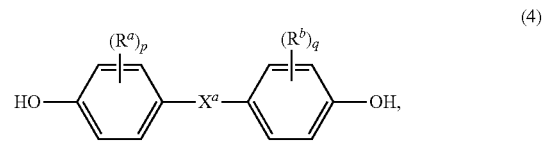

(4)

wherein $R^a$ and $R^b$ each represent a halogen atom or a monovalent hydrocarbon group and can be the same or different; p and q are each independently integers from 0 to 4; and $X^a$ represents one of the groups of formula (5):

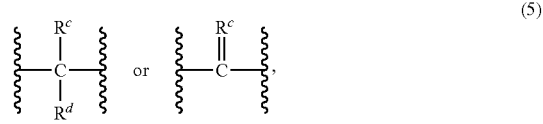

(5)

wherein $R^c$ and $R^d$ each independently represent a hydrogen atom or a monovalent linear or cyclic hydrocarbon group and $R^e$ is a divalent hydrocarbon group.

In various aspects, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group can have 3 to 20 atoms, and can be a single saturated or unsaturated ring, or fused polycyclic ring system wherein the fused rings are saturated, unsaturated, or aromatic.

In various aspects, examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 2,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 3,3-bis(4-hydroxyphenyl)phthalimidine, 2-phenyl-3,3-bis-(4-hydroxyphenyl)phthalimidine (PPPBP), and the like, as well as mixtures including at least one of the foregoing dihydroxy compounds.

In a further aspect, examples of the types of bisphenol compounds that can be represented by formula (3) includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl) propane, 1,1-bis(4-hydroxyphenyl) n-butane, 2,2-bis(4-hydroxy-1-methylphenyl)propane, and 1,1-bis(4-hydroxy-t-butylphenyl)propane. Combinations including at least one of the foregoing dihydroxy compounds can also be used.
In various further aspects, bisphenols containing substituted or unsubstituted cyclohexane units can be used, for example bisphenols of formula (6):

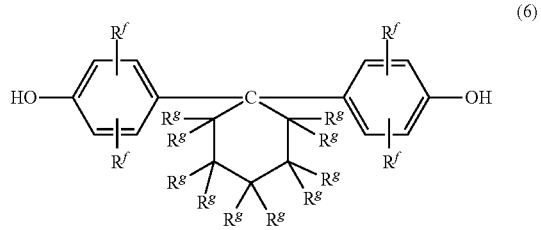

(6)

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

In further aspects, additional useful dihydroxy compounds are those compounds having the formula HO—$R^1$—OH include aromatic dihydroxy compounds of formula (7):

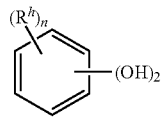

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

In addition to the polycarbonates described above, combinations of the polycarbonate with other thermoplastic polymers, for example combinations of homopolycarbonates and/or polycarbonate copolymers, can be used.

In various aspects, a polycarbonate can employ two or more different dihydroxy compounds or a copolymer of a dihydroxy compounds with a glycol or with a hydroxy- or acid-terminated polyester or with a dibasic acid or hydroxy acid in the event a carbonate copolymer rather than a homopolymer is desired for use. Polyarylates and polyestercarbonate resins or their blends can also be employed. Branched polycarbonates are also useful, as well as blends of linear polycarbonate and a branched polycarbonate. The branched polycarbonates can be prepared by adding a branching agent during polymerization.

In a further aspect, the branching agents include polyfunctional organic compounds containing at least three functional groups selected from hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of from 0.05-2.0 weight percent. Branching agents and procedures for making branched polycarbonates are described in U.S. Pat. Nos. 3,635,895 and 4,001,184. All types of polycarbonate end groups are contemplated as being useful in the thermoplastic composition.

In a further aspect, the polycarbonate can be a linear homopolymer derived from bisphenol A, in which each of $A^1$ and $A^2$ is p-phenylene and $Y^1$ is isopropylidene. The polycarbonates generally can have an intrinsic viscosity, as determined in chloroform at 25° C., of 0.3 to 1.5 deciliters per gram (dl/g), specifically 0.45 to 1.0 dl/g. The polycarbonates can have a weight average molecular weight (Mw) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards. In a yet further aspect, the polycarbonate has an Mw of about 15,000 to about 55,000. In an even further aspect, the polycarbonate has an Mw of about 18,000 to about 40,000.

In a further aspect, a polycarbonate component used in the formulations of the present disclosure can have a melt volume flow rate (often abbreviated MVR) measures the rate of extrusion of a thermoplastics through an orifice at a prescribed temperature and load. Polycarbonates useful for the formation of articles can have an MVR, measured at 300° C., under a load of 1.2 kg according to ASTM D1238-04 or ISO 1133, of 0.5 to 80 cubic centimeters per 10 minutes (cc/10 min) In a still further aspect, the polycarbonate component comprises a two polycarbonate polymers wherein one of the polycarbonate polymers is a poly(aliphatic ester)-polycarbonate. In cases where the polycarbonate components comprises a non-poly(aliphatic ester)-polycarbonate and a poly(aliphatic ester)-polycarbonate, the non-poly(aliphatic ester)-polycarbonate (or a combination of such polycarbonates) can have a MVR measured at 300° C. under a load of 1.2 kg according to ASTM D1238-04 or ISO 1133, of 45 to 75 cc/10 min, specifically 50 to 70 cc/10 min, and more specifically 55 to 65 cc/10 min.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate or polyester carbonate. Such copolymers further contain carbonate units derived from oligomeric ester-containing dihydroxy compounds (also referred to herein as hydroxy end-capped oligomeric acrylate esters).

In various further aspects, "polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), units of formula (8):

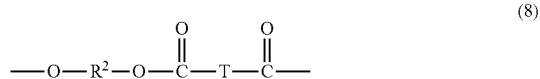

(8)

wherein $R^2$ is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T is a divalent group derived from a dicarboxylic acid (aliphatic, aromatic, or alkyl aromatic), and can be, for example, a $C_{4-18}$ aliphatic group, a $C_{6-20}$ alkylene group, a $C_{6-20}$ alkylene group, a $C_{6-20}$ alicyclic group, a $C_{6-20}$ alkyl aromatic group, or a $C_{6-20}$ aromatic group. $R^2$ can be is a $C_{2-30}$ alkylene group having a straight chain, branched chain, or cyclic (including polycyclic) structure. Alternatively, $R^2$ can be derived from an aromatic dihydroxy compound of formula (4) above, or from an aromatic dihydroxy compound of formula (7) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Examples of specific dicarboxylic acids are terephthalic acid, isophthalic acid, naphthalene dicarboxylic acid, cyclohexane dicarboxylic acid, or combinations thereof. In various aspects, an example of a specific dicarboxylic acid comprises a combination of isophthalic acid and terephthalic acid wherein the weight ratio of isophthalic acid to terephthalic acid is about 91:9 to about 2:98. In another aspect, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a further aspect, the thermoplastic composition comprises a polyester-polycarbonate copolymer, and specifically a polyester-polycarbonate copolymer in which the ester units of formula (8) comprise soft block ester units, also referred to herein as aliphatic dicarboxylic acid ester units. Such a polyester-polycarbonate copolymer comprising soft block ester units is also referred to herein as a poly(aliphatic ester)-polycarbonate. The soft block ester unit can be a $C_{6-20}$ aliphatic dicarboxylic acid ester unit (where $C_{6-20}$ includes the terminal carboxyl groups), and can be straight chain (i.e., unbranched) or branched chain dicarboxylic acids, cycloalkyl or cycloalkylidene-containing dicarboxylic acids units, or combinations of these structural units. In a still further aspect, the $C_{6-20}$ aliphatic dicarboxylic acid ester unit includes a straight chain alkylene group comprising methylene ($-CH_2-$) repeating units. In a yet further aspect, a useful soft block ester unit comprises units of formula (8a):

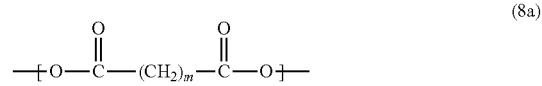

(8a)

where m is 4 to 18. In a further aspect of formula (8a), m is 8 to 10. The poly(aliphatic ester)-polycarbonate can include less than or equal to 25 wt % of the soft block unit. In a still further aspect, a poly(aliphatic ester)-polycarbonate comprises units of formula (8a) in an amount of 0.5 to 10 wt %, specifically 1 to 9 wt %, and more specifically 3 to 8 wt %, based on the total weight of the poly(aliphatic ester)-polycarbonate.

The poly(aliphatic ester)-polycarbonate is a copolymer of soft block ester units and carbonate units. The poly(aliphatic ester)-polycarbonate is shown in formula (8b):

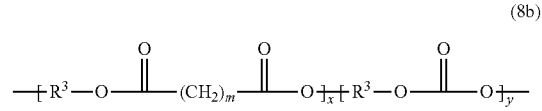

(8b)

where each $R^3$ is independently derived from a dihydroxyaromatic compound of formula (4) or (7), m is 4 to 18, and x and y each represent average weight percentages of the poly(aliphatic ester)-polycarbonate where the average weight percentage ratio x:y is 10:90 to 0.5:99.5, specifically 9:91 to 1:99, and more specifically 8:92 to 3:97, where x+y is 100.

Soft block ester units, as defined herein, can be derived from an alpha, omega $C_{6-20}$ aliphatic dicarboxylic acid or a reactive derivative thereof. In a further aspect, the soft block ester units can be derived from an alpha, omega $C_{10-12}$ aliphatic dicarboxylic acid or a reactive derivative thereof. In a still further aspect, the carboxylate portion of the aliphatic ester unit of formula (8a), in which the terminal carboxylate groups are connected by a chain of repeating methylene (—$CH_2$—) units (where m is as defined for formula (8a)), is derived from the corresponding dicarboxylic acid or reactive derivative thereof, such as the acid halide (specifically, the acid chloride), an ester, or the like. Exemplary alpha, omega dicarboxylic acids (from which the corresponding acid chlorides can be derived) include alpha, omega $C_6$ dicarboxylic acids such as hexanedioic acid (also referred to as adipic acid); alpha, omega $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_{6-20}$ limitation can be used. In various further aspects, the poly(aliphatic ester)-polycarbonate having soft block ester units comprising a straight chain methylene group and a bisphenol A polycarbonate group is shown in formula (8c):

ers, wiped film polymerizers, BANBURY® mixers, single or twin screw extruders, or combinations of the foregoing. In one aspect, volatile monohydric phenol can be removed from the molten reactants by distillation and the polymer is isolated as a molten residue.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O^{2-}$), thiolate ($HS^{31}$), sulfide ($S^{2-}$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediaminetetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium

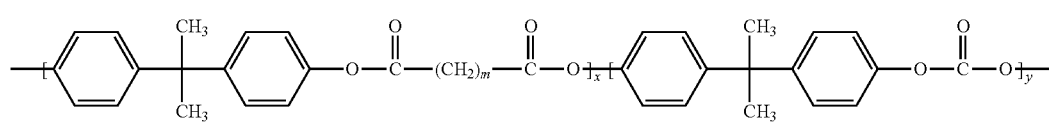

(8c)

where m is 4 to 18 and x and y are as defined for formula (8b). In a specific exemplary aspect, a useful poly(aliphatic ester)-polycarbonate copolymer comprises sebacic acid ester units and bisphenol A carbonate units (formula (8c), where m is 8, and the average weight ratio of x:y is 6:94).

Desirably, the poly(aliphatic ester)-polycarbonate has a glass transition temperature (Tg) of 110 to 145° C., specifically 115 to 145° C., more specifically 120 to 145° C., more specifically 128 to 139° C., and still more specifically 130 to 139° C.

In one aspect, polycarbonates, including polyester-polycarbonates, can be manufactured by processes such as interfacial polymerization and melt polymerization.

The polycarbonate compounds and polymers disclosed herein can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizhydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate, including a polycarbonate polymer as defined herein, can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

Polycarbonates, including polyester-polycarbonates, can be also be manufactured by interfacial polymerization. Although the reaction conditions for interfacial polymerization can vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary aspect, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be about 0.1 to about 10 wt % based on the weight of bisphenol in the phosgenation mixture. In another aspect, an effective amount of phase transfer catalyst can be about 0.5 to about 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, monocarboxylic acid chlorides, and/or monochloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Specifically, polyester-polycarbonates, including poly(aliphatic ester)-polycarbonates, can be prepared by interfacial polymerization. Rather than utilizing the dicarboxylic acid (such as the alpha, omega $C_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. Thus, for example instead of using isophthalic acid, terephthalic acid, or a combination comprising at least one of the foregoing (for poly (arylate ester)-polycarbonates), it is possible to employ isophthaloyl dichloride, terephthaloyl dichloride, and a combination comprising at least one of the foregoing. Similarly, for the poly(aliphatic ester)-polycarbonates, it is possible, and even desirable, to use for example acid chloride derivatives such as a $C_6$ dicarboxylic acid chloride (adipoyl chloride), a $C_{10}$ dicarboxylic acid chloride (sebacoyl chloride), or a $C_{12}$ dicarboxylic acid chloride (dodecanedioyl chloride). The dicarboxylic acid or reactive derivative can be condensed with the dihydroxyaromatic compound in a first condensation, followed by in situ phosgenation to generate the carbonate linkages with the dihydroxyaromatic compound. Alternatively, the dicarboxylic acid or derivative can be condensed with the dihydroxyaromatic compound simultaneously with phosgenation.

In an aspect, where the melt volume rate of an otherwise compositionally suitable poly(aliphatic ester)-polycarbonate is not suitably high, i.e., where the MVR is less than 13 cc/10 min when measured at 250° C., under a load of 1.2 kg, the poly(aliphatic ester)-polycarbonate can be modified to provide a reaction product with a higher flow (i.e., greater than or equal to 13 cc/10 min when measured at 250° C., under a load of 1.2 kg), by treatment using a redistribution catalyst under conditions of reactive extrusion. During reactive extrusion, the redistribution catalyst is typically included in small amounts of less than or equal to 400 ppm by weight, by injecting a dilute aqueous solution of the redistribution catalyst into the extruder being fed with the poly(aliphatic ester)-polycarbonate.

In a further aspect, the redistribution-catalyst is a tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination comprising at least one of the foregoing catalysts, wherein each alkyl is independently a $C_{1-6}$ alkyl. In a specific aspect, a useful redistribution catalyst is a tetra $C_{1-6}$ alkylphosphonium hydroxide, $C_1$-6 alkyl phosphonium phenoxide, or a combination comprising one or more of the foregoing catalysts. An exemplary redistribution catalyst is tetra-n-butylphosphonium hydroxide.

In a further aspect, the redistribution catalyst is present in an amount of 40 to 120 ppm, specifically 40 to 110 ppm, and more specifically 40 to 100 ppm, by weight based on the weight of the poly(aliphatic ester)-polycarbonate.

Copolymers comprising alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (9):

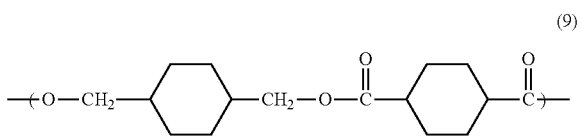

(9)

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Polyester-polycarbonate copolymers generally can have a weight average molecular weight (Mw) of 1,500 to 100,000 g/mol, specifically 1,700 to 50,000 g/mol. In an aspect, poly(aliphatic ester)-polycarbonates have a molecular weight of 15,000 to 45,000 g/mol, specifically 17,000 to 40,000 g/mol, more specifically 20,000 to 30,000 g/mol, and still more specifically 20,000 to 25,000 g/mol. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

A polyester-polycarbonate can in general have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04 or ISO 1133. Commercial polyester blends with polycarbonate are marketed under the trade name XYLEX®, including for example XYLEX® X7300, and commercial polyester-polycarbonates are marketed under the trade name LEXAN® SLX polymers, including for example LEXAN® SLX-9000, and are available from SABIC Innovative Plastics (formerly GE Plastics).

In an aspect, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 6 minutes, according to ASTM D1238-04. Also in an aspect, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 4 minutes, according to ISO 1133.

In an aspect, the thermoplastic composition comprises poly(aliphatic ester)-polycarbonate in an amount of 50 to 100 wt %, based on the total weight of poly(aliphatic ester)-polycarbonate and any added polycarbonate. In a specific aspect, the thermoplastic composition comprises only poly(aliphatic ester)-polycarbonate. In another specific aspect, the thermoplastic comprises poly(aliphatic ester)-polycarbonate that has been reactively extruded to form a reaction product. In another specific aspect, the thermoplastic comprises a blend of poly(aliphatic ester)-polycarbonate that has been reactively extruded.

In a further aspect, the polycarbonate polymer is a homopolymer. In a still further aspect, the homopolymer comprises repeating units derived from bisphenol A.

In a further aspect, the polycarbonate is a copolymer. In a still further aspect, the copolymer comprises repeating units derived from BPA. In yet a further aspect, the copolymer comprises repeating units derived from sebacic acid. In an even further aspect, the copolymer comprises repeating units derived from sebacic acid and BPA.

In a further aspect, the polycarbonate has a weight average molecular weight from about 15,000 to about 50,000 grams/mole, as measured by gel permeation chromatography using BPA polycarbonate standards. In a still further aspect, the polycarbonate has a weight average molecular weight from about 18,000 to about 40,000 grams/mole, as measured by gel permeation chromatography using BPA polycarbonate standards. In yet a further aspect, the polycarbonate has a weight average molecular weight from about 18,000 to about 30,000 grams/mole, as measured by gel permeation chromatography using BPA polycarbonate standards.

In a further aspect, the polycarbonate polymer is present in an amount from about 30 wt % to about 75 wt %. In a still further aspect, the polycarbonate polymer is present in an amount from about 45 wt % to about 75 wt %. In yet a further aspect, the polycarbonate polymer is present in an amount from about 50 wt % to about 75 wt %. In an even further aspect, the polycarbonate polymer is present in an amount from about 35 wt % to about 70 wt %. In a still further aspect, the polycarbonate polymer is present in an amount from about 40 wt % to about 70 wt %. In yet a further aspect, the polycarbonate polymer is present in an amount from about 45 wt % to about 70 wt %. In an even further aspect, the polycarbonate polymer is present in an amount from about 50 wt % to about 70 wt %.

In a further aspect, the polycarbonate polymer comprises a blend of at least two polycarbonate polymers. In a still further aspect, the polycarbonate polymer comprises a first polycarbonate polymer component and a second polycarbonate polymer component.

In a further aspect, the polycarbonate polymer further comprises a copolymer. Useful polycarbonate copolymers are commercially available and include, but are not limited to, those marketed under the trade names LEXAN® EXL and LEXAN® HFD polymers, and are available from SABIC Innovative Plastics (formerly GE Plastics).

In a further aspect, the first polycarbonate polymer component is a high flow polycarbonate. In a still further aspect, the first polycarbonate polymer component has a melt volume flow rate (MVR) from about 17 grams/10 minutes to about 50 grams/10 minutes when measured at 300° C. and under a load of 1.2 kg according to ASTM D1238. In yet a further aspect, the first polycarbonate polymer component has a melt volume flow rate (MVR) from about 20 grams/10 minutes to about 45 grams/10 minutes when measured at 300° C. and under a load of 1.2 kg according to ASTM D1238. In an even further aspect, the first polycarbonate polymer component has a melt volume flow rate (MVR) from about 22 grams/10 minutes to about 40 grams/10 minutes when measured at 300° C. and under a load of 1.2 kg according to ASTM D1238.

In a further aspect, the first polycarbonate polymer component has a weight average molecular weight from about 18,000 to about 40,000 grams/mole, as measured by gel permeation chromatography using BPA polycarbonate standards. In a still further aspect, the first polycarbonate polymer component has a weight average molecular weight from about 18,000 to about 30,000 grams/mole, as measured by gel permeation chromatography using BPA polycarbonate standards. In yet a further aspect, the first polycarbonate polymer component has a weight average molecular weight from about 18,000 to about 25,000 grams/mole, as measured by gel permeation chromatography using BPA polycarbonate standards. In an even further aspect, the first polycarbonate polymer component has a weight average molecular weight from about 18,000 to about 25,000 grams/mole, as measured by gel permeation chromatography using BPA polycarbonate standards.

In a further aspect, the second polycarbonate polymer component is a low flow polycarbonate. In a still further aspect, the second polycarbonate polymer component has a melt volume flow rate (MVR) from about 1.0 gram/10 minutes to about 8.0 grams/10 minutes when measured at 300° C. and under a load of 1.2 kg according to ASTM D1238. In yet a further aspect, the second polycarbonate polymer component has a melt volume flow rate (MVR) from about 1 gram/10 minutes to about 7.2 grams/10 minutes when measured at 300° C. and under a load of 1.2 kg according to ASTM D1238. In an even further aspect, the second polycarbonate polymer component has a melt volume flow rate (MVR) from about 1 gram/10 minutes to about 7.1 grams/10 minutes when measured at 300° C. and under a load of 1.2 kg according to ASTM D1238.

In a further aspect, the second polycarbonate polymer component has a weight average molecular weight from about 18,000 to about 40,000 grams/mole, as measured by gel permeation chromatography using BPA polycarbonate standards. In a still further aspect, the second polycarbonate polymer component has a weight average molecular weight from about 20,000 to about 35,000 grams/mole, as measured by gel permeation chromatography using BPA polycarbonate standards. In yet a further aspect, the second polycarbonate polymer component has a weight average molecular weight from about 20,000 to about 30,000 grams/mole, as measured by gel permeation chromatography using BPA polycarbonate standards. In an even further aspect, the second polycarbonate polymer component has a weight average molecular weight from about 23,000 to about 30,000 grams/mole, as measured by gel permeation chromatography using BPA polycarbonate standards. In a still further aspect, the second polycarbonate polymer component has a weight average molecular weight from about 25,000 to about 30,000 grams/mole, as measured by gel permeation chromatography using BPA polycarbonate standards. In yet a further aspect, the second polycarbonate polymer component has a weight average molecular weight from about 27,000 to about 30,000 grams/mole, as measured by gel permeation chromatography using BPA polycarbonate standards.

Polyester Polymer

In one aspect, the disclosed blended thermoplastic compositions comprise a polyester polymer component. Polyesters having repeating units of formula (8):

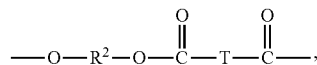

which include poly(alkylene dicarboxylates), liquid crystalline polyesters, and polyester copolymers, are generally useful in the disclosed thermoplastic compositions of the present disclosure. The polyesters described herein are generally completely miscible with the polycarbonates when blended.

Such polyesters generally include aromatic polyesters, poly(alkylene esters) including poly(alkylene arylates), and poly(cycloalkylene diesters). Aromatic polyesters can have a polyester structure according to formula (8), wherein D and T are each aromatic groups as described hereinabove. In an aspect, useful aromatic polyesters can include, for example, poly(isophthalate-terephthalate-resorcinol)esters, poly(isophthalate-terephthalate-bisphenol A)esters, poly[(isophthalate-terephthalate-resorcinol)ester-co-(isophthalate-terephthalate-bisphenol A)]ester, or a combination comprising at least one of these. Also contemplated are aromatic polyesters with a minor amount, e.g., about 0.5 to about 10 wt %, based on the total weight of the polyester, of units derived from an aliphatic diacid and/or an aliphatic polyol to make copolyesters. Poly(alkylene arylates) can have a polyester structure according to formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations comprising at least one of the foregoing polyesters can also be used.

Copolymers comprising alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (9):

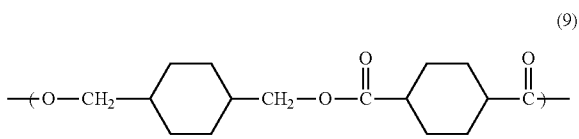

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

In a further aspect, the polyester polymer is polybutylene terephthalate.

In a further aspect, the polyester polymer is polyethylene terephthalate.

In a further aspect, the polyester polymer is present in an amount from about 1 wt % to about 20 wt %. In a still further aspect, the polyester polymer is present in an amount from about 3 wt % to about 17 wt %. In yet a further aspect, the polyester polymer is present in an amount from about 3 wt % to about 15 wt %. In an even further aspect, the polyester polymer is present in an amount from about 3 wt % to about 14 wt %. In a still further aspect, the polyester polymer is present in an amount from about 3 wt % to about 13 wt %. In yet a further aspect, the polyester polymer is present in an amount from about 3 wt % to about 12 wt %. In an even further aspect, the polyester polymer is present in an amount from about 3 wt % to about 11 wt %. In a still further aspect, the polyester polymer is present in an amount from about 3 wt % to about 10 wt %.

Polycarbonate-Polysiloxane Copolymer

The disclosed blended thermoplastic compositions can further comprise a polycarbonate-polysiloxane block copolymer component. As used herein, the term polycarbonate-polysiloxane copolymer is equivalent to polysiloxane-polycarbonate copolymer, polycarbonate-polysiloxane polymer, or polysiloxane-polycarbonate polymer. The polysiloxane-polycarbonate copolymer comprises polydiorganosiloxane blocks comprising structural units of the general formula (I) below:

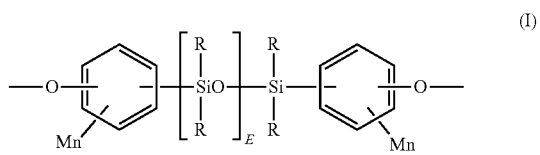

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (II) below:

wherein at least 60 percent of the total number of $R^1$ groups comprise aromatic moieties and the balance thereof comprise aliphatic, alicyclic, or aromatic moieties.

According to exemplary non-limiting aspects of the disclosure, the polycarbonate-polysiloxane block copolymer comprises diorganopolysiloxane blocks of the general formula (III) below:

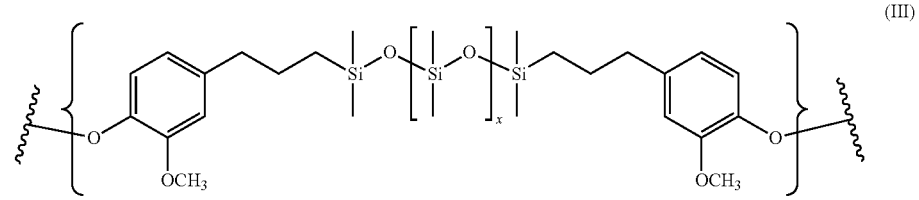

wherein x represents an integer from about 20 to about 60. The polycarbonate blocks according to these aspects can be derived from bisphenol-A monomers.

Diorganopolysiloxane blocks of formula (III) above can be derived from the corresponding dihydroxy compound of formula (IV):

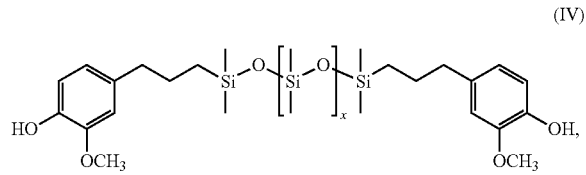

(IV)

wherein x is as described above. Compounds of this type and others are further described in U.S. Pat. No. 4,746,701 to Kress, et al and U.S. Pat. No. 8,017,0697 to Carrillo. Compounds of this formula can be obtained by the reaction of the appropriate dihydroxyarylene compound with, for example, an alpha, omega-bisacetoxypolydiorangonosiloxane under phase transfer conditions.

Such dihydroxy polysiloxanes can be made by effecting a platinum catalyzed addition between a siloxane hydride of the formula (V):

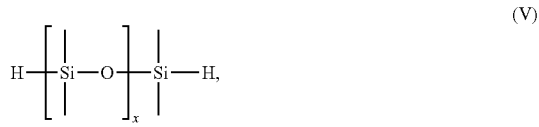

(V)

wherein x is a previously defined, and an aliphatically unsaturated monohydric phenol such as eugenol to yield a compound of formula (IV).

The polycarbonate-polysiloxane copolymer can be manufactured by reaction of a diphenolic polysiloxane, such as that depicted by formula (IV), with a carbonate source and a dihydroxy aromatic compound such as bisphenol-A, optionally in the presence of a phase transfer catalyst as described above. Suitable conditions are similar to those useful in forming polycarbonates. For example, the copolymers can be prepared by phosgenation at temperatures from below 0° C. to about 100° C., including for example, at temperatures from about 25° C. to about 50° C. Since the reaction is exothermic, the rate of phosgene addition can be used to control the reaction temperature. The amount of phosgene required will generally depend upon the amount of the dihydric reactants. Alternatively, the polycarbonate-polysiloxane copolymers can be prepared by co-reacting, in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy diorganopolysiloxane can be selected so as to provide the desired amount of diorganopolysiloxane units in the copolymer. The particular amounts used will therefore be determined depending on desired physical properties of the composition, the value of x (for example, within the range of about 20 to about 60), and the type and relative amount of each component in the composition, including the type and amount of polycarbonate, type and amount of polycarbonate-polysiloxane copolymer, and type and amount of any other additives. Suitable amounts of dihydroxy diorganopolysiloxane can be determined by one of ordinary skill in the art without undue experimentation using the guidelines taught herein.

For example, according to aspects of the disclosure, the polysiloxane-polycarbonate block copolymer can be provided having any desired level of siloxane content. For example, the siloxane content can be in the range of from 4 mole % to 20 mole %. In additional aspects, the siloxane content of the polysiloxane-polycarbonate block copolymer can be in the range of from 4 mole % to 10 mole %. In still further aspects, the siloxane content of the polysiloxane-polycarbonate block copolymer can be in the range of from 4 mole % to 8 mole %. In a further aspect, the polysiloxane-polycarbonate copolymer comprises a diorganosiloxane content in the range of from 5 to 7 mole wt %. In an even further exemplary aspect, the siloxane content of the polysiloxane-polycarbonate block copolymer can be about 6 mole %. Still further, the diorganopolysiloxane blocks can be randomly distributed in the polysiloxane-polycarbonate block copolymer.

The disclosed polysiloxane-polycarbonate block copolymers can also be end-capped as similarly described in connection with the manufacture of polycarbonates set forth herein. For example, according to aspects of the disclosure, a polysiloxane-polycarbonate block copolymer can be end capped with p-cumyl-phenol.

Useful polycarbonate-polysiloxane copolymers are commercially available and include, but are not limited to, those marketed under the trade name LEXAN® EXL polymers, and are available from SABIC Innovative Plastics (formerly GE Plastics), including blends of LEXAN® EXL polymers with different properties. A specific non-limiting example of a suitable LEXAN® EXL polycarbonate-polysiloxane copolymer is the transparent EXL from SABIC is a polycarbonate-polysiloxane (9030T) copolymer, having been tested commercially and found to have about 6 mole % siloxane, a Mw of about 44,600, and a Mn of about 17800 in a polystyrene standard using chloroform solvent.

The polysiloxane polycarbonate copolymer component can be present in the thermoplastic composition in any desired amount. For example, in aspects of the disclosure, the polysiloxane polycarbonate copolymer is present in an amount of about 0 wt % to about 25 wt % of a polycarbonate-polysiloxane copolymer component relative to the total weight of the thermoplastic composition. In various further aspects, the polysiloxane polycarbonate copolymer is present in an amount of at least about 1 wt % relative to the total weight of the thermoplastic composition. For example, the polycarbonate-polysiloxane copolymer can be present in an amount in the range of from 1 wt % to 25 wt % relative to the total weight of the thermoplastic composition, including exemplary amounts of 1.0 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, and 25 wt %. In still further aspects, the polysiloxane polycarbonate copolymer can be present within any range of amounts derived from any two of the above stated values. For example, the polysiloxane polycarbonate copolymer can be present in an amount in the range of from about 1 to about 2 wt %, or in an amount in the range of from about 1 wt % to about 8 wt %.

In one aspect, the polycarbonate-polysiloxane copolymer component is a polycarbonate-polydimethylsiloxane copolymer. In another aspect, the polycarbonate portion of the polycarbonate-polysiloxane copolymer comprises residues derived from BPA. In still another aspect, the polycarbonate portion of the polycarbonate-polysiloxane copolymer comprising residues derived from BPA is a homopolymer. In still another aspect, the polycarbonate-polysiloxane copolymer component comprises a polycarbonate-polysiloxane block copolymer.

In one aspect, the polycarbonate-polysiloxane block copolymer comprises a polycarbonate-polydimethylsiloxane block copolymer. In another aspect, the polycarbonate block comprises residues derived from BPA. In still other aspect, the polycarbonate block comprising residues derived from BPA is a homopolymer.

In one aspect, the polycarbonate-polysiloxane block copolymer comprises from about 3 wt % to about 10 wt % siloxane. In another aspect, the polycarbonate-polysiloxane block copolymer comprises from about 4 wt % to about 8 wt % siloxane. In still another aspect, the polycarbonate-polysiloxane block copolymer comprises about 5 wt % siloxane. In still another aspect, the polycarbonate-polysiloxane block copolymer comprises about 6 wt % siloxane. In still another aspect, the polycarbonate-polysiloxane block copolymer comprises about 7 wt % siloxane. In still another aspect, the polycarbonate-polysiloxane block copolymer comprises about 8 wt % siloxane.

In one aspect, the polysiloxane block has a weight average molecular weight from about 20,000 to about 26,000 Daltons. In another aspect, the polysiloxane block has a weight average molecular weight from about 21,000 to about 25,000 Daltons. In still another aspect, the polysiloxane block has a weight average molecular weight from about 22,000 to about 24,000 Daltons. In still another aspect, the polysiloxane block has a weight average molecular weight of about 22,000 Daltons. In still another aspect, the polysiloxane block has a weight average molecular weight of about 23,000 Daltons. In still another aspect, the polysiloxane block has a weight average molecular weight of about 24,000 Daltons. In still another aspect, the polysiloxane block has a weight average molecular weight of about 25,000 Daltons.

In one aspect, the polycarbonate-polysiloxane block copolymer comprises from about 15 wt % to about 25 wt % siloxane. In another aspect, the polycarbonate-polysiloxane block copolymer comprises from about 17 wt % to about 23 wt % siloxane. In still another aspect, the polycarbonate-polysiloxane block copolymer comprises from about 18 wt % to about 22 wt % siloxane. In still another aspect, the polycarbonate-polysiloxane block copolymer comprises from about 19 wt % to about 21 wt % siloxane. In still another aspect, the polycarbonate-polysiloxane block copolymer comprises about 18 wt % siloxane. In still another aspect, the polycarbonate-polysiloxane block copolymer comprises about 19 wt % siloxane. In still another aspect, the polycarbonate-polysiloxane block copolymer comprises about 20 wt % siloxane. In still another aspect, the polycarbonate-polysiloxane block copolymer comprises about 21 wt % siloxane. In still another aspect, the polycarbonate-polysiloxane block copolymer comprises about 22 wt % siloxane.

In one aspect, the polysiloxane block has a weight average molecular weight from about 25,000 to about 32,000 Daltons. In another aspect, the polysiloxane block has a weight average molecular weight from about 26,000 to about 31,000 Daltons. In still another aspect, the polysiloxane block has a weight average molecular weight from about 27,000 to about 30,000 Daltons. In still another aspect, the polysiloxane block has a weight average molecular weight from about 28,000 to about 30,000 Daltons. In still another aspect, the polysiloxane block has a weight average molecular weight of about 27,000 Daltons. In still another aspect, the polysiloxane block has a weight average molecular weight of about 28,000 Daltons. In still another aspect, the polysiloxane block has a weight average molecular weight of about 29,000 Daltons. In still another aspect, the polysiloxane block has a weight average molecular weight of about 30,000 Daltons. In still another aspect, the polysiloxane block has a weight average molecular weight of about 31,000 Daltons.

In a further aspect, the polycarbonate-polysiloxane copolymer is a block copolymer.

In a further aspect, the polycarbonate block comprises residues derived from BPA. In a still further aspect, the polycarbonate block comprising residues derived from BPA is a homopolymer.

In a further aspect, the polysiloxane block has a weight average molecular weight from about 20,000 to about 26,000 Daltons.

In a further aspect, the polycarbonate-polysiloxane copolymer comprises dimethylsiloxane repeating units.

In a further aspect, the polycarbonate-polysiloxane copolymer comprises a polysiloxane block from about 5 wt % to about 30 wt % of the polycarbonate-polysiloxane copolymer. In a still further aspect, the polycarbonate-polysiloxane copolymer comprises a polysiloxane block from about 10 wt % to about 25 wt % of the polycarbonate-polysiloxane copolymer. In yet a further aspect, the polycarbonate-polysiloxane copolymer comprises a polysiloxane block from about 15 wt % to about 25 wt % of the polycarbonate-polysiloxane copolymer. In an even further aspect, the polycarbonate-polysiloxane copolymer comprises a polysiloxane block from about 17.5 wt % to about 22.5 wt % of the polycarbonate-polysiloxane copolymer.

In a further aspect, the polycarbonate-polysiloxane copolymer comprises a polysiloxane block less than about 10 wt % of the polycarbonate-polysiloxane copolymer. In a still further aspect, the polycarbonate-polysiloxane copolymer comprises a polysiloxane block less than about 8 wt % of the polycarbonate-polysiloxane copolymer. In yet a further aspect, the polycarbonate-polysiloxane copolymer comprises a polysiloxane block from about 3 wt % to about 10 wt % of the polycarbonate-polysiloxane copolymer.

In a further aspect, the polycarbonate-polysiloxane is present in an amount from greater than about 0 wt % to about 15 wt %. In a still further aspect, the polycarbonate-polysiloxane is present in an amount from about 0.01 wt % to about 15 wt %. In a yet further aspect, the polycarbonate-polysiloxane is present in an amount from about 0.1 wt % to about 15 wt %. In an even further aspect, the polycarbonate-polysiloxane is present in an amount from about 1 wt % to about 15 wt %.

In a further aspect, the polycarbonate-polysiloxane is present in an amount from about 5 wt % to about 14 wt %. In yet a further aspect, the polycarbonate-polysiloxane is present in an amount from about 5 wt % to about 13 wt %. In an even further aspect, the polycarbonate-polysiloxane is present in an amount from about 5 wt % to about 12 wt %. In a still further aspect, the polycarbonate-polysiloxane is present in an amount from about 5 wt % to about 11 wt %. In yet a further aspect, the polycarbonate-polysiloxane is present in an amount from about 5 wt % to about 10 wt %. In an even further aspect, the polycarbonate-polysiloxane is present in an amount from about 6 wt % to about 10 wt %.

In a further aspect, the polycarbonate-polysiloxane copolymer comprises a blend of polycarbonate-polysiloxane copolymers. In a still further aspect, the blend of polycarbonate-polysiloxane copolymers comprises a first polycarbonate-polysiloxane copolymer and a second polycarbonate-polysiloxane copolymer.

In a further aspect, the first polycarbonate-polysiloxane copolymer is a block copolymer. In a still further aspect, the first polycarbonate-polysiloxane copolymer is a block copolymer comprising a polysiloxane block from about 5 wt % to about 30 wt % of the polycarbonate-polysiloxane copolymer. In yet a further aspect, the first polycarbonate-polysiloxane copolymer is a block copolymer comprising a polysiloxane block from about 10 wt % to about 25 wt % of the polycarbonate-polysiloxane copolymer. In an even further aspect, the first polycarbonate-polysiloxane copolymer is a block copolymer comprising a polysiloxane block from about 15 wt % to about 25 wt % of the polycarbonate-polysiloxane copolymer. In a still further aspect, the first polycarbonate-polysiloxane copolymer is a block copolymer comprising a polysiloxane block from about 17.5 wt % to about 22.5 wt % of the polycarbonate-polysiloxane copolymer.

In a further aspect, the second polycarbonate-polysiloxane copolymer is a block copolymer. In a still further aspect, the second polycarbonate-polysiloxane copolymer is a block copolymer comprising a polysiloxane block less than about 10 wt % of the polycarbonate-polysiloxane copolymer. In yet a further aspect, the second polycarbonate-polysiloxane copolymer is a block copolymer comprising a polysiloxane block less than about 8 wt % of the polycarbonate-polysiloxane copolymer. In an even further aspect, the second polycarbonate-polysiloxane copolymer is a block copolymer comprising a polysiloxane block less than about 6 wt % of the polycarbonate-polysiloxane copolymer. In a still further aspect, the second polycarbonate-polysiloxane copolymer is a block copolymer comprising a polysiloxane block from about 3 wt % to about 10 wt % of the polycarbonate-polysiloxane copolymer.

Impact Modifier

In one aspect, the disclosed blended thermoplastic compositions of the present disclosure comprise one or more impact modifying agents, or impact modifiers, blended with a disclosed polycarbonate. In a further aspect, a suitable impact modifier is an acrylonitrile-butadiene-styrene polymer. In a still further aspect, the disclosed blended thermoplastic compositions of the present disclosure do not comprise one or more impact modifying agents, or impact modifiers, blended with a disclosed polycarbonate Acrylonitrile-butadiene-styrene ("ABS") graft copolymers contain two or more polymeric parts of different compositions, which are bonded chemically. The graft copolymer is specifically prepared by first polymerizing a conjugated diene, such as butadiene or another conjugated diene, with a monomer copolymerizable therewith, such as styrene, to provide a polymeric backbone. After formation of the polymeric backbone, at least one grafting monomer, and specifically two, are polymerized in the presence of the polymer backbone to obtain the graft copolymer. These resins are prepared by methods well known in the art.

For example, ABS can be made by one or more of emulsion or solution polymerization processes, bulk/mass, suspension and/or emulsion-suspension process routes. In addition, ABS materials can be produced by other process techniques such as batch, semi batch and continuous polymerization for reasons of either manufacturing economics or product performance or both. In order to reduce point defects or inclusions in the inner layer of the final multi-layer article, the ABS is produced by bulk polymerized.

Emulsion polymerization of vinyl monomers gives rise to a family of addition polymers. In many instances the vinyl emulsion polymers are copolymers containing both rubbery and rigid polymer units. Mixtures of emulsion resins, especially mixtures of rubber and rigid vinyl emulsion derived polymers are useful in blends.

Such rubber modified thermoplastic resins made by an emulsion polymerization process can comprise a discontinuous rubber phase dispersed in a continuous rigid thermoplastic phase, wherein at least a portion of the rigid thermoplastic phase is chemically grafted to the rubber phase. Such a rubbery emulsion polymerized resin can be further blended with a vinyl polymer made by an emulsion or bulk polymerized process. However, at least a portion of the vinyl polymer, rubber or rigid thermoplastic phase, blended with polycarbonate, will be made by emulsion polymerization.

Suitable rubbers for use in making a vinyl emulsion polymer blend are rubbery polymers having a glass transition temperature (Tg) of less than or equal to 25° C., more preferably less than or equal to 0° C., and even more preferably less than or equal to −30° C. As referred to herein, the Tg of a polymer is the Tg value of polymer as measured by differential scanning calorimetry (heating rate 20° C./minute, with the Tg value being determined at the inflection point). In another embodiment, the rubber comprises a linear polymer having structural units derived from one or more conjugated diene monomers. Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4-hexadiene, dichlorobutadiene, bromobutadiene and dibromobutadiene as well as mixtures of conjugated diene monomers. In a preferred embodiment, the conjugated diene monomer is 1,3-butadiene.

The emulsion polymer may, optionally, include structural units derived from one or more copolymerizable monoethylenically unsaturated monomers selected from ($C_2$-$C_{12}$) olefin monomers, vinyl aromatic monomers and monoethylenically unsaturated nitrile monomers and ($C_2$-$C_{12}$) alkyl (meth)acrylate monomers. As used herein, the term "($C_2$-$C_{12}$) olefin monomers" means a compound having from 2 to 12 carbon atoms per molecule and having a single site of ethylenic unsaturation per molecule. Suitable ($C_2$-$C_{12}$) olefin monomers include, e.g., ethylene, propene, 1-butene, 1-pentene, heptene, 2-ethyl-hexylene, 2-ethyl-heptene, 1-octene, and 1-nonene. As used herein, the term "($C_1$-$C_{12}$) alkyl" means a straight or branched alkyl substituent group having from 1 to 12 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl and dodecyl, and the terminology "(meth)acrylate monomers" refers collectively to acrylate monomers and methacrylate monomers.

The rubber phase and the rigid thermoplastic phase of the emulsion modified vinyl polymer may, optionally include structural units derived from one or more other copolymerizable monoethylenically unsaturated monomers such as, e.g., monoethylenically unsaturated carboxylic acids such as, e.g., acrylic acid, methacrylic acid, itaconic acid, hydroxy($C_1$-$C_{12}$) alkyl (meth)acrylate monomers such as, e.g., hydroxyethyl methacrylate; ($C_5$-$C_{12}$) cycloalkyl (meth)acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "($C_5$-$C_{12}$) cycloalkyl" means a cyclic alkyl substituent group having from 5 to 12 carbon atoms per group and the term "(meth)acrylamide" refers collectively to acrylamides and methacrylamides.

In some cases the rubber phase of the emulsion polymer is derived from polymerization of a butadiene, $C_4$-$C_{12}$ acrylates or combinations thereof with a rigid phase derived from polymerization of styrene, $C_1$-$C_3$ acrylates, methacrylates, acrylonitrile or combinations thereof where at least a portion of the rigid phase is grafted to the rubber phase. In other instances more than half of the rigid phase will be grafted to the rubber phase.

Suitable vinyl aromatic monomers include, e.g., styrene and substituted styrenes having one or more alkyl, alkoxyl, hydroxyl or halo substituent group attached to the aromatic ring, including, e.g., -methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers. As used herein, the term "monoethylenically unsaturated nitrile monomer" means an acyclic compound that includes a single nitrile group and a single site of ethylenic unsaturation per molecule and includes, e.g., acrylonitrile, methacrylonitrile, a-chloro acrylonitrile.

In an alternative embodiment, the rubber is a copolymer, preferably a block copolymer, comprising structural units derived from one or more conjugated diene monomers and up to 90 percent by weight ("wt %") structural units derived from one or more monomers selected from vinyl aromatic monomers and monoethylenically unsaturated nitrile monomers, such as, a styrene-butadiene copolymer, an acrylonitrile-butadiene copolymer or a styrene-butadiene-acrylonitrile copolymer. In another embodiment, the rubber is a styrene-butadiene block copolymer that contains from 50 to 95 wt % structural units derived from butadiene and from 5 to 50 wt % structural units derived from styrene.

The emulsion derived polymers can be further blended with non-emulsion polymerized vinyl polymers, such as those made with bulk or mass polymerization techniques. A process to prepare mixtures containing polycarbonate, an emulsion derived vinyl polymer, along with a bulk polymerized vinyl polymers, is also contemplated.

The rubber phase can be made by aqueous emulsion polymerization in the presence of a radical initiator, a surfactant and, optionally, a chain transfer agent and coagulated to form particles of rubber phase material. Suitable initiators include conventional free radical initiator such as, e.g., an organic peroxide compound, such as e.g., benzoyl peroxide, a persulfate compound, such as, e.g., potassium persulfate, an azonitrile compound such as, e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate. Suitable chain transfer agents include, for example, a ($C_9$-$C_{13}$) alkyl mercaptan compound such as nonyl mercaptan, t-dodecyl mercaptan. Suitable emulsion aids include, linear or branched carboxylic acid salts, with about 10 to 30 carbon atoms. Suitable salts include ammonium carboxylates and alkaline carboxylates; such as ammonium stearate, methyl ammonium behenate, triethyl ammonium stearate, sodium stearate, sodium iso-stearate, potassium stearate, sodium salts of tallow fatty acids, sodium oleate, sodium palmitate, potassium linoleate, sodium laurate, potassium abieate (rosin acid salt), sodium abietate and combinations thereof. Often mixtures of fatty acid salts derived from natural sources such as seed oils or animal fat (such as tallow fatty acids) are used as emulsifiers.

In various aspects, the emulsion polymerized particles of rubber phase material have a weight average particle size of about 50 to about 800 nanometers ("nm"), as measured by light transmission. In a further aspect, the emulsion polymerized particles of rubber phase material have a weight average particle size of from about 100 to about 500 nm, as measured by light transmission. The size of emulsion polymerized rubber particles can optionally be increased by mechanical, colloidal or chemical agglomeration of the emulsion polymerized particles, according to known techniques.

In a further aspect, acrylonitrile-butadiene-styrene copolymer has an average particle size from about 500 nm to about 1500 nm. In a still further aspect, acrylonitrile-butadiene-styrene copolymer has an average particle size from about 750 nm to about 1250 nm. In a yet further aspect, acrylonitrile-butadiene-styrene copolymer has an average particle size from about 900 nm to about 1100 nm.

The rigid thermoplastic phase comprises one or more vinyl derived thermoplastic polymers and exhibits a Tg of greater than 25° C., preferably greater than or equal to 90° C. and even more preferably greater than or equal to 100° C.

In various aspects, the rigid thermoplastic phase comprises a vinyl aromatic polymer having first structural units derived from one or more vinyl aromatic monomers, preferably styrene, and having second structural units derived from one or more monoethylenically unsaturated nitrile monomers, preferably acrylonitrile. In other cases, the rigid phase comprises from 55 to 99 wt %, still more preferably 60 to 90 wt %, structural units derived from styrene and from 1 to 45 wt %, still more preferably 10 to 40 wt %, structural units derived from acrylonitrile.

The amount of grafting that takes place between the rigid thermoplastic phase and the rubber phase can vary with the relative amount and composition of the rubber phase. In one embodiment, from 10 to 90 wt %, often from 25 to 60 wt %, of the rigid thermoplastic phase is chemically grafted to the rubber phase and from 10 to 90 wt %, preferably from 40 to 75 wt % of the rigid thermoplastic phase remains "free", i.e., non-grafted.

The rigid thermoplastic phase of the rubber modified thermoplastic resin can be formed solely by emulsion polymerization carried out in the presence of the rubber phase or by addition of one or more separately polymerized rigid thermoplastic polymers to a rigid thermoplastic polymer that has been polymerized in the presence of the rubber phase. In various aspects, the weight average molecular weight of the one or more separately polymerized rigid thermoplastic polymers is from about 50,000 to about 100,000 g/mol. In a further aspect, the weight average molecular weight of the one or more separately polymerized rigid thermoplastic polymers is from about 75,000 to about 150,000 g/mol. In a still further aspect, the weight average molecular weight of the one or more separately polymerized rigid thermoplastic polymers is from about 100,000 to about 135,000 g/mol.

In other cases, the rubber modified thermoplastic resin comprises a rubber phase having a polymer with structural units derived from one or more conjugated diene monomers, and, optionally, further comprising structural units derived from one or more monomers selected from vinyl aromatic monomers and monoethylenically unsaturated nitrile monomers, and the rigid thermoplastic phase comprises a polymer having structural units derived from one or more monomers selected from vinyl aromatic monomers and monoethylenically unsaturated nitrile monomers. In one embodiment, the rubber phase of the rubber modified thermoplastic resin comprises a polybutadiene or poly(styrene-butadiene) rubber and the rigid thermoplastic phase comprises a styrene-acrylonitrile copolymer. Vinyl polymers free of alkyl carbon-halogen linkages, specifically bromine and chlorine carbon bond linkages can provide melt stability.

In some instances it is desirable to isolate the emulsion vinyl polymer or copolymer by coagulation in acid. In such instances the emulsion polymer can be contaminated by residual acid, or species derived from the action of such acid, for example carboxylic acids derived from fatty acid soaps used to form the emulsion. The acid used for coagulation can be a mineral acid; such as sulfuric acid, hydrochloric acid, nitric acid, phosphoric acid or mixtures thereof. In some cases the acid used for coagulation has a pH less than about 5.

In a further aspect, the acrylonitrile-butadiene-styrene copolymer is a bulk polymerized ABS. Bulk polymerized ABS (BABS) (e.g., bulk polymerized ABS graft copolymer) comprises an elastomeric phase comprising one or more unsaturated monomers, such as butadiene having a Tg of less than or equal to 10° C., and a polymeric graft phase (e.g., rigid graft phase) comprising a copolymer of one or more monovinylaromatic monomers such as styrene and one or more unsaturated nitrile monomers, such as acrylonitrile having a Tg greater than 50° C. Rigid generally means a Tg greater than room temperature, e.g., a Tg greater than about 21° C. Such bulk polymerized ABS can be prepared by first providing the elastomeric polymer, then polymerizing the constituent monomers of the rigid graft phase in the presence of the elastomer to obtain the elastomer modified copolymer. As the rigid graft phase copolymer molecular weight increases, a phase inversion occurs in which some of the rigid graft phase copolymer will be entrained within the elastomeric phase. Some of the grafts can be attached as graft branches to the elastomer phase.

In a further aspect, the impact modifier component comprises at least one acrylonitrile-butadiene-styrene (ABS) polymer, at least one bulk polymerized ABS (BABS) polymer, at least one siloxane polymer, or at least one methyl methacrylate-butadiene-styrene (MBS) polymer. In a still further aspect, the impact modifier component comprises a methacrylate-butadiene-styrene (MBS) polymer.

In a further aspect, the MBS polymer is present in an amount from about 1 wt % to about 10 wt %. In a still further aspect, the MBS polymer is present in an amount from about 1 wt % to about 8 wt %. In yet a further aspect, the MBS polymer is present in an amount from about 1 wt % to about 6 wt %.

In a further aspect, the MBS polymer composition comprises butadiene content from about 60 wt % to about 80 wt %.

In a further aspect, the MBS polymer composition has a bulk density from about 0.25 g/cm$^3$ to about 0.55 g/cm$^3$.

In a further aspect, the MBS polymer composition has a maximum mean particle diameter from about 200 μm to about 300 μm.

In a further aspect, the impact modifier component comprises an acrylonitrile-butadiene-styrene (ABS) polymer composition. In a still further aspect, the ABS polymer composition is an emulsion polymerized ABS. In yet a further aspect, the ABS polymer composition is a bulk-polymerized ABS. In an even further aspect, the ABS polymer composition is a SAN-grafted emulsion ABS.

In a further aspect, the impact modifier is present is an amount from greater than about 0 wt % to about 15 wt %. In a still further aspect, the impact modifier is present is an amount from about 0.01 wt % to about 15 wt %. In a yet further aspect, the impact modifier is present is an amount from about 0.1 wt % to about 15 wt %. In an even further aspect, the impact modifier is present is an amount from about 1 wt % to about 15 wt %.

In a further aspect, the impact modifier is present is an amount from about 1 wt % to about 14 wt %. In yet a further aspect, the impact modifier is present is an amount from about 1 wt % to about 13 wt %. In an even further aspect, the impact modifier is present is an amount from about 1 wt % to about 12 wt %. In a still further aspect, the impact modifier is present is an amount from about 1 wt % to about 11 wt %. In yet a further aspect, the impact modifier is present is an amount from about 1 wt % to about 10 wt %. In an even further aspect, the impact modifier is present is an amount from about 2 wt % to about 10 wt %. In yet a further aspect, the impact modifier is present is an amount from about 2 wt % to about 9 wt %. In an even further aspect, the impact modifier is present is an amount from about 2 wt % to about 8 wt %. In a still further aspect, the impact modifier is present is an amount from about 2 wt % to about 7 wt %.

Flame Retardant

In one aspect, the blended thermoplastic compositions of the present disclosure can comprise a flame retardant, wherein the flame retardant can comprise any flame retardant material or mixture of flame retardant materials suitable for use in the inventive polymer compositions. In one aspect, the blended thermoplastic compositions of the present disclosure do not comprise a flame retardant.

In various aspects, the flame retardant is a phosphorus-containing flame retardant. In a further aspect, the flame retardant is selected from an oligomeric phosphate flame retardant, polymeric phosphate flame retardant, an aromatic polyphosphate flame retardant, oligomeric phosphonate flame retardant, phenoxyphosphazene oligomeric flame retardant, or mixed phosphate/phosphonate ester flame retardant compositions.

In a further aspect, the blended thermoplastic compositions comprise a flame retardant that is a non-brominated and non-chlorinated phosphorous-containing compound such as an organic phosphate. Exemplary organic phosphates can include an aromatic phosphate of the formula $(GO)_3P=O$, wherein each G is independently an alkyl, cycloalkyl, aryl, alkaryl, or aralkyl group, provided that at least one G is an aromatic group. Two of the G groups can be joined together to provide a cyclic group, for example, diphenyl pentaerythritol diphosphate, which is described by Axelrod in U.S. Pat. No. 4,154,775. Other suitable aromatic phosphates can be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

In a further aspect, di- or polyfunctional aromatic phosphorous-containing compounds can also be present. Examples of suitable di- or polyfunctional aromatic phosphorous-containing compounds include triphenyl phosphate (TPP), resorcinol tetraphenyl diphosphate (RDP), the bis (diphenyl)phosphate of hydroquinone and the bis(diphenyl) phosphate of bisphenol-A, respectively, their oligomeric and polymeric counterparts, and the like.

In a further aspect, the flame retardant can be an organic compounds containing phosphorous-nitrogen bonds. For example, phosphonitrilic chloride, phosphorous ester amides, phosphoric acid amides, phosphonic acid amides, phosphinic acid amides, tris(aziridinyl)phosphine oxide, or the like. In one aspect, a phenoxyphosphazene is used as a flame retardant.

Exemplary flame retardants include aromatic cyclic phosphazenes having a structure represented by the formula:

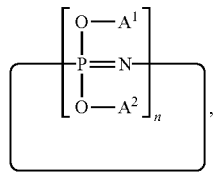

wherein each of $A^1$ and $A^2$ is independently an aryl group having 6 to 10 carbon atoms substituted with 0 to 4 C1-C4 alkyl groups; and n is an integer of 3 to 6. The aryl group of $A^1$ and $A^2$ means an aromatic hydrocarbon group having 6 to 10 atoms. Examples of such groups include phenyl and naphthyl groups. In a further aspect, the aryl group of $A^1$ and $A^2$ is independently selected from phenyl and naphthyl. In a still further aspect, the aryl group of $A^1$ and $A^2$ is phenyl. In a further aspect, aromatic cyclic phosphazene compound is a mixture of compounds represented by the foregoing formula, comprising a mixture of compounds with n=3, n=4, n=5, and n=6.

The "aryl group having 6 to 10 carbon atoms" can be substituted with 0 to 4 C1-C4 alkyl groups, wherein the alkyl group means a straight or branched saturated hydrocarbon group having 1 to 4 carbon atoms. Examples of the group include a methyl group, an ethyl group, a propyl group, an isopropyl group, a butyl group, an isobutyl group, a sec-butyl group, and a tert-butyl group. In various further aspects, the alkyl group has 1 to 3 carbon atoms. In a still further aspect, the alkyl group is methyl.

In a further aspect, each of $A^1$ and $A^2$ is a phenyl group, wherein each of $A^1$ and $A^2$ is independently substituted with 0 to 4 C1-C4 alkyl groups. In a still further aspect, each of $A^1$ and $A^2$ is a phenyl group, wherein each of $A^1$ and $A^2$ is independently substituted with 0 to 4 C1-C3 alkyl groups. In a yet further aspect, each of $A^1$ and $A^2$ is a phenyl group independently substituted with 0 to 4 methyl groups. In an even further aspect, each of $A^1$ and $A^2$ is independently selected from phenyl, o-tolyl, p-tolyl, and m-tolyl.

In various further aspects, three to six $A^1$ groups are present, wherein each $A^1$ group can be the same as or different from each other. In a further aspect, three to six $A^1$ groups are present, wherein each $A^1$ group is the same.

In various further aspects, three to six $A^2$ groups are present, wherein each $A^2$ group can be the same as or different from each other. In a further aspect, three to six $A^2$ groups are present, wherein each $A^2$ group is the same. In a yet further aspect, each $A^1$ and each $A^2$ are the same moiety.

In a further aspect, aromatic cyclic phosphazenes useful in the present disclosure are compounds having a structure represented by the formula:

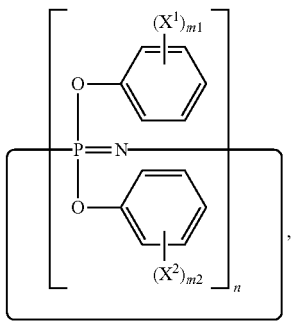

wherein each occurrence of $X^1$ and $X^2$ is independently a C1-C4 alkyl group; wherein each of m1 and m2 is independently an integer of 0 to 4; and wherein n is an integer of 3 to 6. As described above, alkyl group means a straight or branched saturated hydrocarbon group having 1 to 4 carbon atoms. Examples of the group include a methyl group, an ethyl group, a propyl group, an isopropyl group, a butyl group, an isobutyl group, a sec-butyl group, and a tert-butyl group. In various further aspects, the alkyl group has 1 to 3 carbon atoms. In a still further aspect, the alkyl group is methyl. In a further aspect, each of m1 and m2 is independently an integer of 0 to 3. In a still further aspect, each of m1 and m2 is independently an integer of 0 to 2. In a yet further aspect, each of m1 and m2 is independently an integer that is 0 or 1. In an even further aspect, each of m1 and m2 is 0. In a still further aspect, each of m1 and m2 is 1.

In various further aspects, three to six $X^1$ groups are present, wherein each $X^1$ group can be the same as or different from each other. In a further aspect, three to six $X^1$ groups are present, wherein each $X^1$ group is the same.

In various further aspects, three to six $X^2$ groups are present, wherein each $X^2$ group can be the same as or different from each other. In a further aspect, three to six $X^2$ groups are present, wherein each $X^2$ group is the same. In a yet further aspect, each $X^1$ and each $X^2$ are the same moiety.

In various further aspects, the aromatic cyclic phosphazene is a compound selected from Examples of the compound represented by General Formula (I) include 2,2,4,4,6,6-hexaphenoxycyclotriphosphazene, 2,2,4,4,6,6-hexakis(p-tolyloxy)cyclotriphosphazene, 2,2,4,4,6,6-hexakis(m-tolyloxy)cyclotriphosphazene, 2,2,4,4,6,-hexakis(o-tolyloxy) cyclotriphosphazene, 2,4,6-triphenoxy-2,4,6-tris(p-tolyloxy)cyclotriphosphazene, 2,4,6-triphenoxy-2,4,6-tris (m-tolyloxy)cyclotriphosphazene, 2,4,6-triphenoxy-2,4,6-tris(o-tolyloxy)cyclotriphosphazene, 2,4,6-triphenoxy-2,4, 6-tris(2-ethylphenoxy)cyclotriphosphazene, 2,4,6-triphenoxy-2,4,6-tris(3-ethylphenoxy)cyclotriphosphazene, 2,4,6-triphenoxy-2,4,6-tris(4-ethylphenoxy)cyclotriphosphazene, 2,4,6-triphenoxy-2,4,6-tris(2,3-xylyloxy)cyclotriphosphazene, 2,4,6-triphenoxy-2,4,6-tris(2,4-xylyloxy)cyclotriphosphazene, 2,4,6-triphenoxy-2,4,6-tris(2,5-xylyloxy) cyclotriphosphazene, 2,4,6-triphenoxy-2,4,6-tris(2,6-xylyloxy)cyclotriphosphazene, 2,4,6-triphenoxy-2,4,6-tris (3,4-xylyloxy)cyclotriphosphazene, 2,4,6-triphenoxy-2,4,6-tris(3,5-xylyloxy)cyclotriphosphazene, 2,2,4,4,6,6,8,8-octaphenoxycyclotetraphosphazene, 2,2,4,4,6,6,8,8-octakis (p-tolyloxy)cyclotetraphosphazene, 2,2,4,4,6,6,8,8-octakis (m-tolyloxy)cyclotetraphosphazene, 2,2,4,4,6,6,8,8-octakis (o-tolyloxy)cyclotetraphosphazene, 2,4,6,8-tetraphenoxy-2, 4,6,8-tetrakis(p-tolyloxy)cyclotetraphosphazene, 2,4,6,8-tetraphenoxy-2,4,6,8-tetrakis(m-tolyloxy) cyclotetraphosphazene, and 2,4,6,8-tetraphenoxy-2,4,6,8- tetrakis(o-tolyloxy)cyclotetraphosphazene. In a still further aspect, the aromatic cyclic phosphazene is selected from 2,2, 4,4,6,6-hexaphenoxycyclotriphosphazene, 2,4,6-triphenoxy-2,4,6-tris(p-tolyloxy)cyclotriphosphazene, 2,4,6-triphenoxy-2,4,6-tris(m-tolyloxy)cyclotriphosphazene, and 2,4, 6-triphenoxy-2,4,6-tris(o-tolyloxy)cyclotriphosphazene.

In a further aspect, the aromatic cyclic phosphazene comprises at least one compound represented by one of the phosphazene formulas described herein as a main component. In various aspects, the content of the aromatic cyclic phosphazene composition is about 90 wt %. In a further aspect, the content of the aromatic cyclic phosphazene composition is about 95 wt %. In a still further aspect, the content of the aromatic cyclic phosphazene composition is about 100 wt %.

Other components in the aromatic cyclic phosphazene composition are not specifically limited as long as the object of the present disclosure is not impaired. Aromatic cyclic phosphazene-containing flame retardant useful in the present disclosure are commerically available. Suitable examples of such commercial products include "Rabitle FP-110" and "Rabitle FP-390" manufactured by FUSHIMI Pharmaceutical Co., Ltd.

In a further aspect, the phosphorus-containing flame retardant is selected from a phosphine, a phosphine oxide, a bis-phosphine, a phosphonium salt, a phosphinic acid salt, a phosphoric ester, and a phosphorous ester.

In a further aspect, the phosphorus-containing flame retardant is selected from rescorcinol bis(diphenyl phosphate), resorcinol bis(dixylenyl phosphate), hydroquinone bis(diphenyl phosphate), bisphenol-A bis(diphenyl phosphate), 4,4'-biphenol bis(diphenyl phosphate), triphenyl phosphate, methylneopentyl phosphite, pentaerythritol diethyl diphosphite, methyl neopentyl phosphonate, phenyl neopentyl phosphate, pentaerythritol diphenyldiphosphate, dicyclopentyl hypodiphosphate, dineopentyl hypophosphite, phenylpyrocatechol phosphite, ethylpyrocatechol phosphate and dipyrocatechol hypodiphosphate. In a still further aspect, the flame retardant is selected from triphenyl phosphate; cresyldiphenylphosphate; tri(isopropylphenyl)phosphate; resorcinol bis(diphenylphosphate); and bisphenol-A bis(diphenyl phosphate). In a yet further aspect, resorcinol bis(biphenyl phosphate), bisphenol A bis(diphenyl phosphate) hydroquinone bis(diphenyl phosphate), phosphoric acid, 1,3-phenylene tetraphenyl ester), bis-phenol-A bis-diphenyl phosphate) or mixtures thereof. In an even further aspect, the flame retardant is bisphenol-A bis(diphenyl phosphate). In a still further aspect, the phosphorus-containing flame retardant is selected from resorcinol bis(biphenyl phosphate), bisphenol A bis(diphenyl phosphate), and hydroquinone bis(diphenyl phosphate), or mixtures thereof. In yet a further aspect, the phosphorus-containing flame retardant is bisphenol A bis(diphenyl phosphate). In an even further aspect, the phosphorus-containing flame retardant is resorcinol bis(biphenyl phosphate).

In a further aspect, the flame retardant is present in an amount from greater than about 0 wt % to about 15 wt %. In a still further aspect, the flame retardant is present in an amount from about 0.01 wt % to about 15 wt %. In a yet further aspect, the flame retardant is present in an amount from about 0.1 wt % to about 15 wt %. In an even further aspect, the flame retardant is present in an amount from about 1 wt % to about 15 wt %.

In a further aspect, the flame retardant is present in an amount from about 1 wt % to about 14 wt %. In a still further aspect, the flame retardant is present in an amount from about 1 wt % to about 13 wt %. In yet a further aspect, the flame retardant is present in an amount from about 1 wt % to about 12 wt %. In an even further aspect, the flame retardant is present in an amount from about 2 wt % to about 12 wt %. In a still further aspect, the flame retardant is present in an amount from about 3 wt % to about 12 wt %. In yet a further aspect, the flame retardant is present in an amount from about 4 wt % to about 12 wt %. In an even further aspect, the flame retardant is present in an amount from about 4 wt % to about 11 wt %. In a still further aspect, the flame retardant is present in an amount from about 4 wt % to about 10 wt %. In yet a further aspect, the flame retardant is present in an amount from about 5 wt % to about 10 wt %. In an even further aspect, the flame retardant is present in an amount from about 6 wt % to about 10 wt %.

Fillers

In one aspect, the disclosed blended thermoplastic compositions comprise one or more fillers to increase the stiffness (e.g. modulus and tensile strength). Examples of suitable fillers or reinforcing agents include any materials known for these uses, provided that they do not adversely affect the desired properties. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dehydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide, or the like; barium compounds such as barium titanate, barium ferrite, barium sulfate, heavy spar, or the like; metals and metal oxides such as particulate or fibrous aluminum, bronze, zinc, copper and nickel, or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as kenaf, cellulose, cotton, sisal, jute, flax, starch, corn flour, lignin, ramie, rattan, agave, bamboo, hemp, ground nut shells, corn, coconut (coir), rice grain husks or the like; organic fillers such as polytetrafluoroethylene, reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, Tripoli, diatomaceous earth, carbon black, or the like, or combinations comprising at least one of the foregoing fillers or reinforcing agents. In a still further aspect, the filler is talc, glass fiber, kenaf fiber, or combinations thereof. In yet a further aspect, the filler is glass fiber. The fillers and reinforcing agents can be coated with a layer of metallic material to facilitate conductivity, or surface treated with silanes, siloxanes, or a combination of silanes and siloxanes to improved adhesion and dispersion with the polymeric matrix resin.

In a further aspect, the reinforcing filler is selected from glass fiber, carbon fiber, and a mineral filler, or combinations thereof. In a still further aspect, the reinforcing filler is selected from glass beads, glass fiber, glass flakes, mica, talc, clay, wollastonite, zinc sulfide, zinc oxide, carbon fiber, ceramic-coated graphite, titanium dioxide, or combinations thereof.

In a further aspect, the reinforcing fillers can be provided in the form of monofilament or multifilament fibers and can be used either alone or in combination with other types of fiber, for example, co-weaving or core/sheath, side-by-side, orange-type or matrix and fibril constructions, or by other methods known to one skilled in the art of fiber manufacture. Suitable co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

In one aspect, the reinforcing fillers can be surface-treated with a surface treatment agent containing a coupling agent. Suitable coupling agents include, but are not limited to, silane-based coupling agents, or titanate-based coupling agents, or a mixture thereof. Applicable silane-based coupling agents include aminosilane, epoxysilane, amidosilane, azidosilane and acrylsilane.

In various aspects, the surface coating can range in amount from about 0.1 wt % to about 5.0 wt % of the total weight of the filler and surface coating. In a further aspect, the surface coating can range in amount from about 0.1 wt % to about 2.0 wt % of the total weight of the filler and surface coating.

In a further aspect, the reinforcing filler is particulate.

In a further aspect, the reinforcing filler is fibrous. In a still further aspect, the fibrous filler has a circular cross-section. In yet a further aspect, the fibrous filler has a non-circular cross-section.

In various aspects, the diameter of the reinforcing fillers can range from 5 to 35 µm. In a further aspect, the diameter of the glass fibers can range from 10 to 20 µm. In this area, where a thermoplastic resin is reinforced with glass fibers in a composite form, fibers having a length of 0.4 mm are generally referred to as long fibers, and shorter ones are referred to as short fibers. In a still further aspect, the fibers can have a length of 1 mm or longer. In yet a further aspect, the fibers can have a length of 2 mm or longer.

In a further aspect, the reinforcing filler is a glass fiber. In a still further aspect, the glass fiber is continuous. In yet a further aspect, the glass fiber is chopped. In an even further aspect, the glass fiber has a round, flat, or irregular cross-section. In a still further aspect, the glass fiber has a round cross-section. In yet a further aspect, the glass fiber has a diameter from about 4 µm to about 15 µm.

In a further aspect, the reinforcing filler is a carbon fiber. In a still further aspect, the carbon fiber is continuous. In yet a further aspect, the carbon fiber is chopped. In an even further aspect, the carbon fiber has a round, flat, or irregular cross-section. In a still further aspect, the carbon fiber has a round cross-section. In yet a further aspect, the carbon fiber has a diameter from about 4 µm to about 15 µm.

In a further aspect, the reinforcing filler is present in an amount from about 25 wt % to about 60 wt %. In a still further aspect, the reinforcing filler is present in an amount from about 25 wt % to about 55 wt %. In yet a further aspect, the reinforcing filler is present in an amount from about 30 wt % to about 55 wt %. In an even further aspect, the reinforcing filler is present in an amount from about 30 wt % to about 50 wt %.

Optional Chain Extender

The disclosed polymer compositions can optionally comprise a chain extender component. The chain extender component can be a monofunctional or a polyfunctional chain extender material that can be either polymeric or non-polymeric. Examples of carboxy reactive groups include epoxides, carbodiimides, orthoesters, oxazolines, oxiranes, aziridines, and anhydrides. The chain extender component can also include other functionalities that are either reactive or non-reactive under the described processing conditions. Non-limiting examples of reactive moieties include reactive silicon-containing materials, for example epoxy-modified silicone and silane monomers and polymers.

The term "polyfunctional" or "multifunctional" in connection with the chain extender material means that at least two carboxy reactive groups are present in each molecule of the material. Particularly useful polyfunctional chain extender materials include materials with at least two reactive epoxy groups. The polyfunctional epoxy material can contain aromatic and/or aliphatic residues. Examples include epoxy novolac resins, cycloaliphatic epoxy resins, the reaction product of epoxidized vegetable (e.g., soybean, linseed) oils, epoxy resins based on bisphenol A, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate.

In one aspect, the polyfunctional chain extender material is an epoxy-functional polymer, which as used herein includes oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl $C_{1-4}$ (alkyl)acrylate, allyl glycidyl ethacrylate, and glycidyl itoconate).

For example, in one aspect the polyfunctional chain extender material is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least 10, for example, or greater than 15, or greater than 20. These polymeric materials generally have a molecular weight greater than 3000, specifically greater than 4000, and more specifically greater than 6000. These are commercially available for example from Johnson Polymer, LLC (now BASF) under the trade name of JONCRYL, more specifically, JONCRYL ADR 4368.

Another example of a carboxy reactive copolymer is the reaction product of an epoxy-functional $C_{1-4}$(alkyl)acrylic monomer with a non-functional styrenic and/or $C_{1-4}$(alkyl) acrylate and/or olefin monomer. In one aspect the epoxy polymer is the reaction product of an epoxy-functional (meth)

acrylic monomer and a non-functional styrenic and/or (meth) acrylate monomer. These chain extender materials are characterized by relatively low molecular weights. In another aspect, the chain extender material is an epoxy-functional styrene (meth)acrylic copolymer produced from an epoxy functional (meth)acrylic monomer and styrene. As used herein, the term "(meth)acrylic" includes both acrylic and methacrylic monomers, and the term "(meth)acrylate" includes both acrylate and methacrylate monomers. Examples of specific epoxy-functional (meth)acrylic monomers include, but are not limited to, those containing 1,2-epoxy groups such as glycidyl acrylate and glycidyl methacrylate.

Suitable $C_{1-4}$(alkyl)acrylate comonomers include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain aspects the styrenic monomer is styrene and/or alpha-methyl styrene.

Other suitable materials with multiple epoxy groups are acrylic and/or polyolefin copolymers and oligomers containing glycidyl groups incorporated as side chains. Suitable epoxy-functional materials are available from Dow Chemical Company under the trade name DER332, DER661, and DER667; from Resolution Performance Products (now Hexion Performance Chemicals, Inc.) under the trade name EPON Resin 1001F, 1004F, 1005F, 1007F, and 1009F; from Shell Oil Corporation (now Hexion Performance Chemicals, Inc.) under the trade names EPON 826, 828, and 871; from Ciba-Geigy Corporation under the trade names CY-182 and CY-183; and from Dow Chemical Co. under the trade names ERL-4221 and ERL-4299. Johnson Polymer Co. (now owned by BASF) is a supplier of an epoxy functionalized material known as ADR 4368 and ADR 4300. A further example of a polyfunctional chain extender material is a copolymer or terpolymer including units of ethylene and glycidyl methacrylate (GMA), sold by Arkema under the trade name of LOTADER. In one aspect, the chain extender material is a combination comprising a poly(ethylene-glycidyl methacrylate-co-methacrylate).

In another aspect, the chain extender material is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below 1000 g/mol, to facilitate blending with the polyester resin. In one aspect the difunctional epoxy compounds have at least one of the epoxide groups on a cyclohexane ring. Exemplary difunctional epoxy compounds include, but are not limited to, 3,4-epoxycyclohexyl-3,4-epoxycyclohexyl carboxylate, bis(3,4-epoxycyclohexylmethyl)adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid, the diglycidyl ester of hexahydrophthalic acid, and bis(3,4-epoxy-6-methylcyclohexylmethyl)adipate, butadiene diepoxide, vinylcyclohexene diepoxide, dicyclopentadiene diepoxide, and the like.

The difunctional epoxide compounds can be made by techniques well known to those skilled in the art. For example, the corresponding α- or β-dihydroxy compounds can be dehydrated to produce the epoxide groups, or the corresponding unsaturated compounds can be epoxidized by treatment with a peracid, such as peracetic acid, in well-known techniques. The compounds are also commercially available.

Optional Polymer Composition Additives

In addition to the foregoing components, the disclosed blended thermoplastic compositions can optionally comprise a balance amount of one or more additive materials ordinarily incorporated in polycarbonate resin compositions of this type, with the proviso that the additives are selected so as to not significantly adversely affect the desired properties of the polycarbonate composition. Combinations of additives can be used. Such additives can be mixed at a suitable time during the mixing of the components for forming the composition. Exemplary and non-limiting examples of additive materials that can be present in the disclosed polycarbonate compositions include an acid scavenger, anti-drip agent, antioxidant, antistatic agent, chain extender, colorant (e.g., pigment and/or dye), de-molding agent, flow promoter, lubricant, mold release agent, plasticizer, quenching agent, stabilizer (including for example a thermal stabilizer, a hydrolytic stabilizer, or a light stabilizer), UV absorbing additive, and UV reflecting additive, or any combination thereof.

In a further aspect, the disclosed blended thermoplastic compositions can further comprise a primary antioxidant or "stabilizer" (e.g., a hindered phenol) and, optionally, a secondary antioxidant (e.g., a phosphate and/or thioester). Suitable antioxidant additives include, for example, organic phosphites such as tris(nonyl phenyl)phosphite, tris(2,4-di-t-butylphenyl)phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants.

In a further aspect, the antioxidant is a primary antioxidant, a secondary antioxidant, or combinations thereof. In a still further aspect, the primary antioxidant is selected from a hindered phenol and secondary aryl amine, or a combination thereof. In yet a further aspect, the hindered phenol comprises one or more compounds selected from triethylene glycol bis[3-(3-t-butyl-5-methyl-4-hydroxyphenyl)propionate], 1,6-hexanediolbis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, N,N'-hexamethylene bis(3,5-di-t-butyl-4-hydroxy-hydrocinnamamide), tetrakis(methylene 3,5-di-tert-butyl-hydroxycinnamate) methane, and octadecyl 3,5-di-tert-butylhydroxyhydrocinnamate. In an even further aspect, the hindered phenol comprises octadecyl-3-(3,5-di-t-butyl-4-hydroxyphenyl)-propionate.

In a further aspect, the secondary anti-oxidant is selected from an organophosphate and thioester, or a combination thereof. In a still further aspect, the secondary anti-oxidant comprises one or more compounds selected from tetrakis(2,4-di-tert-butylphenyl) [1,1-biphenyl]-4,4'-diylbisphosphonite, tris(2,4-di-tert-butylphenyl)phosphite, bis(2,4-di-tert-butylphenyl)pentaerythritol diphosphite, bis(2,4-dicumylphenyl)pentaerytritoldiphosphite, tris(nonyl phenyl) phosphite, and distearyl pentaerythritol diphosphite. In yet a further aspect, the secondary anti-oxidant comprises tris(2,4-di-tert-butylphenyl)phosphite.

Antioxidants are generally used in amounts of about 0.01 wt % to about 3 wt %, optionally about 0.05 wt % to about 2.0 wt % of the blended thermoplastic composition.

In a further aspect, the primary antioxidant is present in an amount from about 0.01 wt % to about 3 wt %. In another aspect, the primary antioxidant is present in an amount from about 0.01 wt % to about 2.5 wt %. In still another aspect, the primary antioxidant is present in an amount from about 0.5 wt % to about 2.5 wt %. In yet a further aspect, the primary antioxidant is present in an amount from about 0.5 wt % to about 2.0 wt %. In still another aspect, the primary antioxidant is present in an amount from about 0.1 wt % to about 0.5 wt %. In still another aspect, the primary antioxidant is present in an amount from about 0.2 wt % to about 0.5 wt %. In still another aspect, the primary antioxidant is present in an amount from about 0.2 wt % to about 0.4 wt %.

In a further aspect, the secondary antioxidant is present in an amount from about 0.01 wt % to about 3.0 wt %. In another aspect, the secondary antioxidant is present in an amount from about 0.01 wt % to about 2.5 wt %. In still another aspect, the secondary antioxidant is present in an amount from about 0.5 wt % to about 2.5 wt %. In yet another aspect, the secondary antioxidant is present in an amount from about 0.5 wt % to about 2.0 wt %. In still another aspect, the secondary antioxidant is present in an amount from about 0.05 wt % to about 0.4 wt %. In still another aspect, the secondary antioxidant is present in an amount from about 0.05 wt % to about 0.2 wt %.

In various aspects, the disclosed blended thermoplastic compositions further comprise a hydrolytic stabilizer, wherein the hydrolytic stabilizer comprises a hydrotalcite and an inorganic buffer salt. In a further aspect, the disclosed polycarbonate blend composition comprises a hydrolytic stabilizer, wherein the hydrolytic stabilizer comprises one or more hydrotalcites and an inorganic buffer salt comprising one or more inorganic salts capable of pH buffering. Either synthetic hydrotalcites or natural hydrotalcites can be used as the hydrotalcite compound in the present disclosure. Exemplary hydrotalcites that are useful in the compositions of the present are commercially available and include, but are not limited to, magnesium hydrotalcites such as DHT-4C (available from Kyowa Chemical Co.); Hysafe 539 and Hysafe 530 (available from J.M. Huber Corporation).

In a further aspect, suitable thermal stabilizer additives include, for example, organic phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, organic phosphates such as trimethyl phosphate, thioesters such as pentaerythritol betalaurylthiopropionate, and the like, or combinations comprising at least one of the foregoing thermal stabilizers.

Thermal stabilizers are generally used in amounts of about 0.01 wt % to about 5 wt %, optionally about 0.05 wt % to about 2.0 wt % of the polycarbonate blend composition. In one aspect, the thermal stabilizer is present in an amount from about 0.01 wt % to about 3.0 wt %. In another aspect, the thermal stabilizer is present in an amount from about 0.01 wt % to about 2.5 wt %. In still another aspect, the thermal stabilizer is present in an amount from about 0.5 wt % to about 2.5 wt %. In still another aspect, the thermal stabilizer is present in an amount from about 0.5 wt % to about 2.0 wt %. In still another aspect, the thermal stabilizer is present in an amount from about 0.1 wt % to about 0.8 wt %. In still another aspect, the thermal stabilizer is present in an amount from about 0.1 wt % to about 0.7 wt %. In still another aspect, the thermal stabilizer is present in an amount from about 0.1 wt % to about 0.6 wt %. In still another aspect, the thermal stabilizer is present in an amount from about 0.1 wt % to about 0.5 wt %. In still another aspect, the thermal stabilizer is present in an amount from about 0.1 wt % to about 0.4 wt %. In still another aspect, the thermal stabilizer is present in an amount from about 0.05 wt % to about 1.0 wt %.

In various aspects, plasticizers, lubricants, and/or mold release agents additives can also be used. There is a considerable overlap among these types of materials, which include, for example, phthalic acid esters such as dioctyl-4,5-epoxy-hexahydrophthalate; tris(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g. methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof; waxes such as beeswax, montan wax, paraffin wax or the like.

Blended thermoplastic composition additives such as plasticizers, lubricants, and/or mold release agents additive are generally used in amounts of about 0.01 wt % to about 20 wt %, optionally about 0.5 wt % to about 10 wt % the polycarbonate blend composition. In one aspect, the mold release agent is methyl stearate; stearyl stearate or pentaerythritol tetrastearate. In another aspect, the mold release agent is pentaerythritol tetrastearate.

one aspect, the mold release agent is present in an amount from about 0.01 wt % to about 3.0 wt %. In another aspect, the mold release agent is present in an amount from about 0.01 wt % to about 2.5 wt %. In still another aspect, the mold release agent is present in an amount from about 0.5 wt % to about 2.5 wt %. In still another aspect, the mold release agent is present in an amount from about 0.5 wt % to about 2.0 wt %. In still another aspect, the mold release agent is present in an amount from about 0.1 wt % to about 0.6 wt %. In still another aspect, the mold release agent is present in an amount from about 0.1 wt % to about 0.5 wt %.

In a further aspect, the anti-drip agents can also be present. In a further aspect, the anti-drip agent is a styrene-acrylonitrile copolymer encapsulated polytetrafluoroethylene. Exemplary anti-drip agents can include a fibril forming or non-fibril forming fluoropolymer such as polytetrafluoroethylene (PTFE). The anti-drip agent can optionally be encapsulated by a rigid copolymer, for example styrene-acrylonitrile (SAN). PTFE encapsulated in SAN is known as TSAN. Encapsulated fluoropolymers can be made by polymerizing the encapsulating polymer in the presence of the fluoropolymer, for example, in an aqueous dispersion. TSAN can provide significant advantages over PTFE, in that TSAN can be more readily dispersed in the composition. A suitable TSAN can comprise, for example, about 50 wt % PTFE and about 50 wt % SAN, based on the total weight of the encapsulated fluoropolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer.

In a further aspect, the anti-drip agent is present in an amount from about 0.01 wt % to about 3 wt %. In a still further aspect, the anti-drip agent is present in an amount from about 0.01 wt % to about 2.5 wt %. In yet a further aspect, the anti-drip agent is present in an amount from about 0.5 wt % to about 2.0 wt %.

Methods of Manufacture

The blended thermoplastic compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods. For example, the polycarbonate polymer, polyester polymer, the flame retardant, the reinforcing filler and/or other optional components are first blended in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

In a further aspect, during the injection molding step, the phosphorus-containing flame retardant and thermally conductive filler can be mixed with the thermoplastic polymer. In another aspect, the blend composition further comprises one or more optional additives selected from an primary antioxidant, secondary anti-oxidant, additional fillers, and stabilizer. In a still further aspect, single shot injection molding can be used to produce the parts or articles to be laser structured. In another aspect, additional ingredients can be added to the polymer composition after this step.

In various aspects, the disclosure relates to methods of a composition, comprising mixing: (a) from about 30 wt % to about 75 wt % of a polycarbonate polymer; (b) from about 1 wt % to about 20 wt % of a polyester polymer; and (c) from about 25 wt % to about 60 wt % of a reinforcing filler; wherein the combined weight percent value of all components does not exceed about 100 wt %; and wherein all weight percent values are based on the total weight of the composition.

In one aspect, the disclosure relates to methods of preparing a composition, comprising mixing: (a) from about 30 wt % to about 75 wt % of a polycarbonate polymer; (b) from about 1 wt % to about 20 wt % of a polyester polymer; (c) from about 1 wt % to about 15 wt % of a flame retardant; and (d) from about 25 wt % to about 60 wt % of a reinforcing filler; wherein the combined weight percent value of all components does not exceed about 100 wt %; and wherein all weight percent values are based on the total weight of the composition. In a further aspect, mixing comprises the steps of: (i) pre-blending from about 30 wt % to about 75 wt % of a polycarbonate polymer powder with from about 1 wt % to about 15 wt % of a flame retardant to provide a pre-blended polycarbonate polymer and flame retardant; (ii) feeding the pre-blended polycarbonate polymer and flame retardant into an extruder apparatus; (iii) compounding in the extruder apparatus the pre-blended polycarbonate polymer and flame retardant with from about 1 wt % to about 20 wt % of a polyester polymer; and (iv) in a downstream extruder zone feeding into the extruder apparatus from about 25 wt % to about 60 wt % of a reinforcing filler.

Articles of Manufacture

In one aspect, the present disclosure pertains to shaped, formed, or molded articles comprising the blended thermoplastic compositions. The blended thermoplastic compositions can be molded into useful shaped articles by a variety of means such as injection molding, extrusion, rotational molding, blow molding and thermoforming to form articles such as, for example, personal computers, notebook and portable computers, cell phone antennas and other such communications equipment, medical applications, RFID applications, automotive applications, and the like. In a further aspect, the article is extrusion molded. In a still further aspect, the article is injection molded.

In various aspects, the polymer composition can be used in the field of electronics. In a further aspect, non-limiting examples of fields which can use the disclosed blended thermoplastic polymer compositions include electrical, electro-mechanical, radio frequency (RF) technology, telecommunication, automotive, aviation, medical, sensor, military, and security. In a still further aspect, the use of the disclosed blended thermoplastic polymer compositions can also be present in overlapping fields, for example in mechatronic systems that integrate mechanical and electrical properties which may, for example, be used in automotive or medical engineering.

In a further aspect, the article is an electronic device, automotive device, telecommunication device, medical device, security device, or mechatronic device. In a still further aspect, the article is selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device, and RFID device. In yet a further aspect, the article is selected from a computer device, sensor device, security device, RF antenna device, LED device and RFID device. In an even further aspect, the article is selected from a computer device, RF antenna device, LED device and RFID device. In a still further aspect, the article is selected from a RF antenna device, LED device and RFID device. In yet a further aspect, the article is selected from a RF antenna device and RFID device. In an even further aspect, the article is a LED device. In a still further aspect, the LED device is selected from a LED tube, a LED socket, and a LED heat sink.

In various aspects, molded articles according to the present disclosure can be used to produce a device in one or more of the foregoing fields. In a still further aspect, non-limiting examples of such devices in these fields which can use the disclosed blended thermoplastic polymer compositions according to the present disclosure include computer devices, household appliances, decoration devices, electromagnetic interference devices, printed circuits, Wi-Fi devices, Bluetooth devices, GPS devices, cellular antenna devices, smart phone devices, automotive devices, military devices, aerospace devices, medical devices, such as hearing aids, sensor devices, security devices, shielding devices, RF antenna devices, or RFID devices.

In a further aspect, the molded articles can be used to manufacture devices in the automotive field. In a still further aspect, non-limiting examples of such devices in the automotive field which can use the disclosed blended thermoplastic compositions in the vehicle's interior include adaptive cruise control, headlight sensors, windshield wiper sensors, and door/window switches. In a further aspect, non-limiting examples of devices in the automotive field which can the disclosed blended thermoplastic compositions in the vehicle's exterior include pressure and flow sensors for engine management, air conditioning, crash detection, and exterior lighting fixtures.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

In various aspects, the present disclosure pertains to and includes at least the following aspects.

Without further elaboration, it is believed that one skilled in the art can, using the description herein, utilize the present disclosure. The following examples are included to provide addition guidance to those skilled in the art of practicing the claimed disclosure. The examples provided are merely representative of the work and contribute to the teaching of the present disclosure. Accordingly, these examples are not intended to limit the disclosure in any manner.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

Aspects

The present disclosure comprises at least the following aspects.

Aspect 1: A blended thermoplastic composition comprising: from about 30 wt % to about 75 wt % of a polycarbonate polymer; from about 1 wt % to about 20 wt % of a polyester polymer; and from about 25 wt % to about 60 wt % of a reinforcing filler; wherein the combined weight percent value of all components does not exceed about 100 wt %; and wherein all weight percent values are based on the total weight of the composition.

Aspect 2: The composition of aspect 1, wherein the polycarbonate is a homopolymer.

Aspect 3: The composition of aspect 2, wherein the homopolymer comprises repeating units derived from bisphenol A.

Aspect 4: The composition of aspect 1, wherein the polycarbonate is a copolymer.

Aspect 5: The composition of aspect 4, wherein the copolymer comprises repeating units derived from BPA.

Aspect 6: The composition of aspect 4, wherein the copolymer comprises repeating units derived from sebacic acid.

Aspect 7: The composition of aspect 4, wherein the copolymer comprises repeating units derived from sebacic acid and BPA.

Aspect 8: The composition of any of aspects 1-5, wherein the polycarbonate polymer is present in an amount from about 45 wt % to about 70 wt %.

Aspect 9: The composition of aspect 1, wherein the polycarbonate polymer comprises a blend of at least two polycarbonate polymers.

Aspect 10: The composition of any of aspects 1-Error! Reference source not found., wherein the polyester polymer is polybutylene terephthalate.

Aspect 11: The composition of any of aspects 1-Error! Reference source not found., wherein the polyester polymer is polyethylene terephthalate.

Aspect 12: The composition of any of aspects 1-7, wherein the polyester polymer is present in an amount from about 3 wt % to about 15 wt %.

Aspect 13: The composition of any of aspects 1-7, wherein the polyester polymer is present in an amount from about 3 wt % to about 10 wt %.

Aspect 14: The composition of aspect 1, wherein the composition does not comprise a polycarbonate-polysiloxane copolymer.

Aspect 15: The composition of aspect 1, further comprising a polycarbonate-polysiloxane copolymer.

Aspect 16: The composition of aspect 15, wherein the polycarbonate-polysiloxane copolymer is a block copolymer.

Aspect 17: The composition of aspect 16, wherein the polycarbonate block comprises residues derived from BPA.

Aspect 18: The composition of aspect 16, wherein the polycarbonate block comprising residues derived from BPA is a homopolymer.

Aspect 19: The composition of any of aspects 15-18, wherein the polycarbonate-polysiloxane copolymer comprises dimethylsiloxane repeating units.

Aspect 20: The composition of any of aspects 15-19, wherein the polycarbonate-polysiloxane copolymer comprises a polysiloxane block from about 5 wt % to about 30 wt % of the polycarbonate-polysiloxane copolymer.

Aspect 21: The composition of any of aspects 15-20, wherein the polycarbonate-polysiloxane copolymer comprises a polysiloxane block less than about 10 wt % of the polycarbonate-polysiloxane copolymer.

Aspect 22: The composition of any of aspects 15-21, wherein the polycarbonate-polysiloxane is present in an amount greater than about 0 wt % to about 15 wt %.

Aspect 23: The composition of any of aspects 15-21, wherein the polycarbonate-polysiloxane is present in an amount from about 5 wt % to about 10 wt %.

Aspect 24: The composition of any of aspects 15-23, wherein the polycarbonate-polysiloxane copolymer comprises a blend of polycarbonate-polysiloxane copolymers.

Aspect 25: The composition of aspect 1, wherein the composition does not comprise an impact modifier.

Aspect 26: The composition of aspect 1, further comprising an impact modifier.

Aspect 27: The composition of aspect 26, wherein the impact modifier component comprises at least one acrylonitrile-butadiene-styrene (ABS) polymer, at least one bulk polymerized ABS (BABS) polymer, or at least one methyl methacrylate-butadiene-styrene (MBS) polymer.

Aspect 28: The composition of aspect 26, wherein the impact modifier component comprises a methacrylate-butadiene-styrene (MBS) polymer.

Aspect 29: The composition of aspect 26, wherein the impact modifier component comprises an acrylonitrile-butadiene-styrene (ABS) polymer composition.

Aspect 30: The composition of aspect 29, wherein the ABS polymer composition is an emulsion polymerized ABS.

Aspect 31: The composition of aspect 29, wherein the ABS polymer composition is a bulk-polymerized ABS.

Aspect 32: The composition of aspect 29, wherein the ABS polymer composition is a SAN-grafted emulsion ABS.

Aspect 33: The composition of any of aspects 26-32, wherein the impact modifier is present in an amount greater than about 0 wt % to about 10 wt %.

Aspect 34: The composition of any of aspects 26-32, wherein the impact modifier is present is an amount from about 3 wt % to about 6 wt %.

Aspect 35: The composition of any of aspects 1-34, wherein the composition does not comprise a flame retardant.

Aspect 36: The composition of any of aspects 1-34, further comprising at least one flame retardant.

Aspect 37: The composition of aspect 36, wherein the at least one flame retardant is a phosphorus-containing flame retardant Aspect 38: The composition of aspect 37, wherein the phosphorus-containing flame retardant is selected from a phosphine, a phosphine oxide, a bisphosphine, a phosphonium salt, a phosphinic acid salt, a phosphoric ester, and a phosphorous ester Aspect 39: The composition of aspect 37, wherein the phosphorus-containing flame retardant is an aromatic cyclic phosphazene compound.

Aspect 40: The composition of aspect 39, wherein the aromatic cyclic phosphazene compound has a structure represented by the formula:

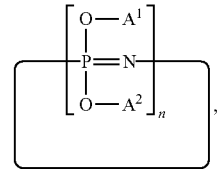

wherein each of $A^1$ and $A^2$ is independently an aryl group having 6 to 10 carbon atoms optionally substituted with 1 to 4 alkyl groups having 1 to 4 carbon atoms; and wherein n is an integer of 3 to 6.

Aspect 41: The composition of aspect 39, wherein aromatic cyclic phosphazene is:

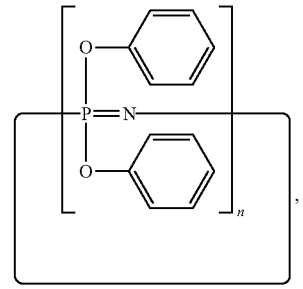

wherein n is 3 to 6.

Aspect 42: The composition of aspect 37, wherein the phosphorus-containing flame retardant is selected from rescorcinol bis(diphenyl phosphate), resorcinol bis(dixylenyl phosphate), hydroquinone bis(diphenyl phosphate), bisphenol-A bis(diphenyl phosphate), 4,4'-biphenol bis(diphenyl phosphate), triphenyl phosphate, methylneopentyl phosphite, pentaerythritol diethyl diphosphite, methyl neopentyl phosphonate, phenyl neopentyl phosphate, pentaerythritol diphenyldiphosphate, dicyclopentyl hypodiphosphate, dineopentyl hypophosphite, phenylpyrocatechol phosphite, ethylpyrocatechol phosphate and dipyrocatechol hypodiphosphate.

Aspect 44: The composition of aspect 37, wherein the phosphorus-containing flame retardant is selected from resorcinol bis(biphenyl phosphate), bisphenol A bis(diphenyl phosphate), and hydroquinone bis(diphenyl phosphate), or mixtures thereof.

Aspect 45: The composition of aspect 37, wherein the phosphorus-containing flame retardant is bisphenol A bis (diphenyl phosphate).

Aspect 46: The composition of aspect 37, wherein the phosphorus-containing flame retardant is resorcinol bis(biphenyl phosphate).

Aspect 47: The composition of any of aspects 36-46, wherein the flame retardant is present in an amount from greater than about 0 wt % to about 15 wt %.

Aspect 48: The composition of any of aspects 36-46, wherein the flame retardant is present in an amount from about 4 wt % to about 12 wt %.

Aspect 49: The composition of any of aspects 36-46, wherein the flame retardant is present in an amount from about 6 wt % to about 10 wt %.

Aspect 50: The composition of any of aspects 1-49, wherein the reinforcing filler is selected from glass fiber, carbon fiber, and a mineral filler, or combinations thereof.

Aspect 51: The composition of any of aspects 1-49, wherein the reinforcing filler is selected from glass beads, glass fiber, glass flakes, mica, talc, clay, wollastonite, zinc sulfide, zinc oxide, carbon fiber, ceramic-coated graphite, and titanium dioxide.

Aspect 52: The composition of any of aspects 1-49, wherein the reinforcing filler is a glass fiber.

Aspect 53: The composition of aspect 52, wherein the glass fiber is continuous.

Aspect 54: The composition of aspect 52, wherein the glass fiber is chopped.

Aspect 55: The composition of aspect 52, wherein the glass fiber has a round, flat, or irregular cross-section.

Aspect 56: The composition of aspect 52, wherein the glass fiber has a round cross-section.

Aspect 57: The composition of aspect 52, wherein the glass fiber has a diameter from about 4 µm to about 15 µm.

Aspect 58: The composition of any of aspects 1-57, wherein the reinforcing filler is particulate.

Aspect 59: The composition of any of aspects 1-57, wherein the reinforcing filler is fibrous.

Aspect 60: The composition of aspect 59, wherein the fibrous filler has a circular cross-section.

Aspect 61: The composition of aspect 59, wherein the fibrous filler has a non-circular cross-section.

Aspect 62: The composition of any of aspects 1-61, further comprising at least one additive.

Aspect 63: The composition of aspect 62, wherein the additive is selected from an anti-drip agent, antioxidant, anti-static agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer, or combinations thereof.

Aspect 64: The composition of aspect 63, wherein the anti-drip agent is present in an amount from about 0.05 wt % to about 3 wt %.

Aspect 65: The composition of aspect 63, wherein the anti-drip agent is present in an amount from about 0.1 wt % to about 2 wt %.

Aspect 66: The composition of aspect 63, wherein the anti-drip agent is present in an amount from about 0.1 wt % to about 1 wt %.

Aspect 67: The composition of any of aspects 63-66, wherein the anti-drip agent is a styrene-acrylonitrile copolymer encapsulated polytetrafluoroethylene.

Aspect 68: The composition of aspect 63, wherein the antioxidant is a primary antioxidant, a secondary antioxidant, or combinations thereof.

Aspect 69: The composition of aspect 68, wherein the primary antioxidant is selected from a hindered phenol and secondary aryl amine, or a combination thereof.

Aspect 70: The composition of aspect 69, wherein the hindered phenol comprises one or more compounds selected from triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, N,N'-hexamethylene bis(3,5-di-t-butyl-4-hydroxyhydrocinnamamide), tetrakis(methylene 3,5-di-tert-butylhydroxycinnamate)methane, and octadecyl 3,5-di-tert-butylhydroxyhydrocinnamate.

Aspect 71: The composition of aspect 69, wherein the hindered phenol comprises octadecyl-3-(3,5-di-t-butyl-4-hydroxyphenyl)-propionate.

Aspect 72: The composition of aspect 68, wherein the primary anti-oxidant is present in an amount from about 0.01 wt % to about 0.50 wt %.

Aspect 73: The composition of aspect 68, wherein the primary anti-oxidant is present in an amount from about 0.01 wt % to about 0.20 wt %.

Aspect 74: The composition of aspect 68, wherein the primary anti-oxidant is present in an amount from about 0.01 wt % to about 0.10 wt %.

Aspect 75: The composition of aspect 68, wherein the secondary anti-oxidant is selected from an organophosphate and thioester, or a combination thereof.

Aspect 76: The composition of aspect 27, wherein the secondary anti-oxidant comprises one or more compounds selected from tetrakis(2,4-di-tert-butylphenyl) [1,1-biphenyl]-4,4'-diylbisphosphonite, tris(2,4-di-tert-butylphenyl) phosphite, bis(2,4-di-tert-butylphenyl)pentaerythritol diphosphite, bis(2,4-dicumylphenyl)pentaerytritoldiphosphite, tris(nonyl phenyl)phosphite, and distearyl pentaerythritol diphosphite.

Aspect 77: The composition of aspect 27, wherein the secondary anti-oxidant comprises tris(2,4-di-tert-butylphenyl)phosphite.

Aspect 78: The composition of aspect 27, wherein the secondary anti-oxidant is present in an amount from about 0.01 wt % to about 0.50 wt %.

Aspect 79: The composition of aspect 27, wherein the secondary anti-oxidant is present in an amount from about 0.01 wt % to about 0.20 wt %.

Aspect 80: The composition of aspect 27, wherein the secondary anti-oxidant is present in an amount from about 0.01 wt % to about 0.10 wt %.

Aspect 81: A blended thermoplastic composition comprising: from about 40 wt % to about 70 wt % of a polycarbonate polymer; from about 3 wt % to about 15 wt % of at least one polyester polymer; and from about 30 wt % to about 55 wt % of at least one reinforcing filler; wherein the combined weight percent value of all components does not exceed about 100 wt %; and wherein all weight percent values are based on the total weight of the composition.

Aspect 82: A blended thermoplastic composition comprising: from about 50 wt % to about 70 wt % of a polycarbonate polymer; from about 3 wt % to about 10 wt % of at least one polyester polymer; and from about 30 wt % to about 50 wt % of at least one reinforcing filler; wherein the combined weight percent value of all components does not exceed about 100 wt %; and wherein all weight percent values are based on the total weight of the composition.

Aspect 83: A blended thermoplastic composition comprising: from about 30 wt % to about 75 wt % of a polycarbonate polymer; from about 1 wt % to about 20 wt % of a polyester polymer; from about 25 wt % to about 60 wt % of a reinforcing filler; from about 1 wt % to about 15 wt % of a flame retardant; and from about 1 wt % to about 15 wt % of a polycarbonate-polysiloxane polymer; wherein the combined weight percent value of all components does not exceed about 100 wt %; and wherein all weight percent values are based on the total weight of the composition.

Aspect 84: A blended thermoplastic composition comprising: from about 40 wt % to about 70 wt % of a polycarbonate polymer; from about 3 wt % to about 15 wt % of at least one polyester polymer; from about 30 wt % to about 55 wt % of at least one reinforcing filler; from about 4 wt % to about 12 wt % of at least one flame retardant; and from about 5 wt % to about 10 wt % of a polycarbonate-polysiloxane polymer; wherein the combined weight percent value of all components does not exceed about 100 wt %; and wherein all weight percent values are based on the total weight of the composition.

Aspect 85: A blended thermoplastic composition comprising: from about 50 wt % to about 70 wt % of a polycarbonate polymer; from about 3 wt % to about 10 wt % of at least one polyester polymer; from about 30 wt % to about 50 wt % of at least one reinforcing filler; from about 6 wt % to about 10 wt % of at least one flame retardant; and from about 6 wt % to about 10 wt % of a polycarbonate-polysiloxane polymer; wherein the combined weight percent value of all components does not exceed about 100 wt %; and wherein all weight percent values are based on the total weight of the composition.

Aspect 86: A blended thermoplastic composition comprising: from about 30 wt % to about 75 wt % of a polycarbonate polymer; from about 1 wt % to about 20 wt % of a polyester polymer; from about 25 wt % to about 60 wt % of a reinforcing filler; from about 1 wt % to about 15 wt % of a flame retardant; and from about 1 wt % to about 15 wt % of an impact modifier polymer; wherein the combined weight percent value of all components does not exceed about 100 wt %; and wherein all weight percent values are based on the total weight of the composition.

Aspect 87: A blended thermoplastic composition comprising: from about 40 wt % to about 70 wt % of a polycarbonate polymer; from about 3 wt % to about 15 wt % of at least one polyester polymer; from about 30 wt % to about 55 wt % of at least one reinforcing filler; from about 4 wt % to about 12 wt % of at least one flame retardant; and from about 5 wt % to about 10 wt % of an impact modifier polymer; wherein the combined weight percent value of all components does not exceed about 100 wt %; and wherein all weight percent values are based on the total weight of the composition.

Aspect 88: A blended thermoplastic composition comprising: from about 50 wt % to about 70 wt % of a polycarbonate polymer; from about 3 wt % to about 10 wt % of at least one polyester polymer; from about 30 wt % to about 50 wt % of at least one reinforcing filler; from about 6 wt % to about 10 wt % of at least one flame retardant; and from about 6 wt % to about 10 wt % of an impact modifier polymer; wherein the combined weight percent value of all components does not exceed about 100 wt %; and wherein all weight percent values are based on the total weight of the composition.

Aspect 89: The composition of any of aspects 1-88, wherein the blended thermoplastic composition has a melt volume rate (MVR) when determined in accordance with ASTM 1238 at 300° C. under a load of 1.2 kg of at least about 10% greater than a reference composition comprising or consisting essentially of substantially the same proportions of the same polycarbonate polymer component and the same reinforcing fiber, in the absence of the polyester polymer.

Aspect 90: The composition of any of aspects 1-88, wherein a molded sample of the blended thermoplastic composition has an unnotched Izod impact strength when determined in accordance with ASTM D4812 of at least about 15% greater than a reference composition comprising or consisting essentially of substantially the same proportions of the same polycarbonate polymer component and the same reinforcing fiber, in the absence of the polyester polymer.

Aspect 91: An article comprising any of the compositions of aspects 1-90.

Aspect 92: The article of aspect 91, wherein the article is molded.

Aspect 93: The article of aspect 91, wherein the article is extrusion molded.

Aspect 94: The article of aspect 91, wherein the article is injection molded.

Aspect 95: The article of any of aspects 91-94, wherein the article is selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device and RFID device.

Aspect 96: The article of any of aspects 91-94, wherein the article is selected from a computer device, electromagnetic interference device, automotive device, medical device, sensor device, security device, shielding device, RF antenna device, LED device and RFID device.

Aspect 97: The article of any of aspects 91-94, wherein the article is selected from a computer device, sensor device, security device, RF antenna device, LED device and RFID device.

Aspect 98: The article of any of aspects 91-94, wherein the article is selected from a computer device, LED device and RFID device.

Aspect 99: The article of any of aspects 91-94, wherein the article is a LED device.

Aspect 100: The article of aspect 99, wherein the LED device is a LED lamp.

Aspect 101: A method of preparing a composition, comprising mixing: from about 30 wt % to about 75 wt % of a polycarbonate polymer; from about 1 wt % to about 20 wt % of a polyester polymer; and from about 25 wt % to about 60 wt % of a reinforcing filler; wherein the combined weight percent value of all components does not exceed about 100 wt %; and wherein all weight percent values are based on the total weight of the composition.

Aspect 102: A method of preparing a composition, comprising mixing: from about 30 wt % to about 75 wt % of a polycarbonate polymer; from about 1 wt % to about 20 wt % of a polyester polymer; from about 1 wt % to about 15 wt % of a flame retardant; and from about 25 wt % to about 60 wt % of a reinforcing filler; wherein the combined weight percent value of all components does not exceed about 100 wt %; and wherein all weight percent values are based on the total weight of the composition.

Aspect 103: The method of aspect 102, where mixing comprises the steps of: pre-blending from about 30 wt % to about 75 wt % of a polycarbonate polymer powder with from about 1 wt % to about 15 wt % of a flame retardant to provide a pre-blended polycarbonate polymer and flame retardant;

feeding the pre-blended polycarbonate polymer and flame retardant into an extruder apparatus; compounding in the extruder apparatus the pre-blended polycarbonate polymer and flame retardant with from about 1 wt % to about 20 wt % of a polyester polymer; and in a downstream extruder zone feeding into the extruder apparatus from about 25 wt % to about 60 wt % of a reinforcing filler.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The materials shown in Table 1 were used to prepare the compositions described in Tables 4-8 and evaluated herein. All samples were prepared by melt extrusion on a Toshiba Twin screw extruder, using different melt temperature and RPM according to different base resin. Tests were all conducted in accordance with ASTM standards, referenced in each test below.

TABLE 1

| Component | Chemical description | Source |
|---|---|---|
| PC1 | Sebacic acid/BPA/PCP polyestercarbonate, 6.0 mol % sebacic acid, Mw about 21,500 g/mol [CAS: 137397-37-6]; commercially available under the trade name Lexan HFD Resin. | SABIC Innovative Plastics ("SABIC I.P.") |
| PC2 | Sebacic acid/BPA/PCP polyestercarbonate, 8.3 mol % sebacic acid, Mw about 35,400 g/mol [CAS: 137397-37-6]; commercially available under the trade name Lexan HFD Resin. | SABIC I.P. |
| PC3 | BPA polycarbonate resin made by an interfacial process with MVR at 300° C./1.2 kg, of about 5.1 to about 6.9 g/10 min. | SABIC I.P. |
| PC4 | BPA polycarbonate resin made by a melt process with an MVR at 300° C./1.2 kg, of about 23.5 to about 28.5 g/10 min. | SABIC I.P. |
| PC-PS1 | BPA polycarbonate-polydimethylsiloxane block copolymer comprising about 20 wt % of siloxane and about 80 wt % by of BPA; PCP end-capped; with a polydiorganosiloxane chain length of about 45 (D45) and having a Mw of about 29,900 Daltons. | SABIC I.P. |
| IM1 | Acrylic impact modifier that is an emulsion copolymer of methacrylate butyl acrylate with a core-shell structure; commercially available under the trade name PARALOID EXL™ 3330 | |
| PE1 | Poly(1,4-butylene terephthalate) with an intrinsic viscosity of about 0.7 cm$^3$/g as measured in a 60:40 phenol/tetrachloroethane mixture and a Mw of about 66,000 Daltons using polystyrene standards; commercially available under the trade name iQ PBT. | SABIC I.P. |
| GF1 | Chopped round glass fiber with about 4.5 mm length and 6.5 μm diameter; commercially available under the trade name ECS303H. | Chongqing Polycomp International Corp. |
| GF2 | Chopped flat glass fiber with an oblateness of about ¼ (e.g. short axis of about 7 μm and major axis of about 28 μm); commercially available under the trade name CSG 3PA-830. | Nittobo Co., Ltd |
| MR1 | Pentaerythritol tetrastearate commercially available from Faci as PETS G. | Faci Asia Pacific PTE LTD |
| AO1 | Octadecyl3(3,5ditertbutyl4hydroxyphenyl)propionate, hindered phenol; commercially available under the trade name Irganox 1076. | Ciba Specialty Chemicals Corporation |
| AO2 | Tris(2,4-ditert-butylphenyl) phosphite; commercially available under the trade name IRGAFOS 168. | Ciba Specialty Chemicals Corporation |
| ADD1 | Styrene-acrylate copolymer with glycidyl groups; commercially available under the trade name Joncryl ™ ADR 4368. | BASF |
| FR1 | Aromatic cyclic phosphazene-containing flame retardant with chemical formula $(C_{12}H_{10}NPO_2)_n$, wherein n is from about 3 to about 6; commercially available under the trade name Rabitle FP-110. | Fushimi Pharmaceutical Co., Ltd. |

In each of the examples, sample systems were prepared using the compounding and molding profiles shown in Tables 2 and 3. The compounding was processed on Toshiba SE37 mm twin-screw extruder. Glass fiber was fed from downstream, zone 7. Other components were fed from main throat from upstream. Additives were pre-blended with PC powder by superblender and then fed. Table 2 presents data for compounding conditions and Table 3 presents data for molding conditions.

TABLE 2

| Parameters | UOM | Settings |
| --- | --- | --- |
| Compounder | NONE | Toshiba TEM-37BS |
| Barrel Size | mm | 1500 |
| Die | mm | 4 |
| Zone 1 Temp | °C. | 50 |
| Zone 2 Temp | °C. | 100 |
| Zone 3 Temp | °C. | 200 |
| Zone 4 Temp | °C. | 250 |
| Zone 5 Temp | °C. | 260 |
| Zone 6 Temp | °C. | 260 |
| Zone 7 Temp | °C. | 260 |
| Zone 8 Temp | °C. | 260 |
| Zone 9 Temp | °C. | 260 |
| Zone 10 Temp | °C. | 260 |
| Zone 11 Temp | °C. | 260 |
| Die Temp | °C. | 265 |
| Screw speed | rpm | 300 |
| Throughput | kg/hr | 40 |
| Vacuum | MPa | −0.08 |
| Side Feeder speed | rpm | 300 |
| Side feeder1 | Note | barrel 7 |

TABLE 3

| Parameter | Unit | Settings |
| --- | --- | --- |
| Pre-drying time | Hour | 4 |
| Pre-drying temp | °C. | 100-120 |
| Hopper temp | °C. | 50 |
| Zone 1 temp | °C. | 280 |
| Zone 2 temp | °C. | 300 |
| Zone 3 temp | °C. | 300 |
| Nozzle temp | °C. | 290 |
| Mold temp | °C. | 80-100 |
| Screw speed | rpm | 60-100 |
| Back pressure | kgf/cm$^2$ | 230-50 |
| Cooling time | s | 20 |
| Molding Machine | NONE | FANUC |
| Shot volume | mm | 84 |
| Injection speed(mm/s) | mm/s | 60 |
| Holding pressure | kgf/cm$^2$ | 800 |
| Max. Injection pressure | kgf/cm$^2$ | 1000 |

Melt Volume Rate ("MVR") was determined at 300° C. under a 1.2 or 2.16 kg load (as indicated in the tables below), over 10 minutes, in accordance with ASTM D1238. Each reported value is an average value of three tested specimens. Results are reported in cm$^3$ per 10 minutes.

Notched Izod Impact Strength ("NII") was used to compare the impact resistances of plastic materials and was determined in accordance with ASTM D256 at the indicated temperatures with a 5.5 Joule hammer using 3.2 mm thick notched Izod bars. The ASTM results are defined as the impact energy in joules used to break the test specimen, divided by the specimen area at the notch. Results are reported in J/m.

NII ductility is reported as the percentage of ten samples which, upon failure in the notched Izod impact test, exhibited a ductile failure rather than rigid failure, the latter being characterized by cracking and the formation of shards.

Instrumental Impact (or Multi-Axial Impact or Dynatup Plaque Impact Energy; indicated as "MAI" in tables below) was measured according to ASTM D3763 at −30° C. using a plaque 3.2 mm thick, 10 centimeters diameter, with a dart diameter of 12.5 mm at 2.3 m/s. The results represent the total energy absorbed and are reported in Joules. This procedure provides information on how a material behaves under multiaxial deformation conditions. The final test result is calculated as the average of the test results of either five or ten test plaques. Results are reported in Joules.

Melt viscosities ("MV") were measured in accordance with the ISO 11443 standard at 300° C. and a 645 s$^{-1}$ shear rate. The granules were dried for 4 hours at 100° C. Results are reported in Pa-s.

Notched Charpy Impact Strength ("NCI") was used to compare the impact resistances of plastic materials and was determined in accordance with ISO 179 at the indicated temperatures with a 5.5 Joule hammer using 3.2 mm thick notched Izod bars. The ISO results are defined as the impact energy in kilojoules used to break the test specimen, divided by the specimen area at the notch. Results are reported in KJ/m$^2$.

NCI ductility is reported as the percentage of ten samples, upon failure in the notched Izod impact test, exhibited a ductile failure rather than rigid failure, the latter being characterized by cracking and the formation of shards.

The composition of samples #1-6 is detailed in Table 4.

TABLE 4

| Item description | 1 | 2 | 3 | 4 | 5 | 6 |
| --- | --- | --- | --- | --- | --- | --- |
| PC4 | 58.2 | 50.88 | 42.58 | 58.2 | 50.88 | 42.58 |
| PC3 | 21.31 | 18.63 | 11.93 | 21.31 | 18.63 | 11.93 |
| IM1 | 5 | 5 | 5 | 5 | 5 | 5 |
| PBT1 | 5 | 15 | 30 | 5 | 15 | 30 |
| PA | 0.01 | 0.01 | 0.01 | 0.01 | 0.01 | 0.01 |
| MR1 | 0.1 | 0.1 | 0.1 | 0.1 | 0.1 | 0.1 |
| TS1 | 0.3 | 0.3 | 0.3 | 0.3 | 0.3 | 0.3 |
| TS2 | 0.1 | 0.1 | 0.1 | 0.1 | 0.1 | 0.1 |
| C1 | 0.5 | 0.5 | 0.5 | 0.5 | 0.5 | 0.5 |
| GF1 | — | — | — | 10 | 10 | 10 |
| GF2 | 10 | 10 | 10 | — | — | — |
| TOTAL (wt %) | 100.52 | 100.52 | 100.52 | 100.52 | 100.52 | 100.52 |

The effect of polyester in 10% glass fiber filled BPA PC with polyester loading between 5-30% on samples #1-6 is shown in Table 5.

TABLE 5

| Typical Properties | Test Method | Unit | 1 | 2 | 3 | 4 | 5 | 6 |
| --- | --- | --- | --- | --- | --- | --- | --- | --- |
| MVR @ 300° C./1.2 Kg | ASTM D1238 | cm$^3$/10 min | 17.6 | 28.8 | 72.3 | 15 | 23.6 | 37.1 |
| Tensile Modulus | ISO 527 | MPa | 4018 | 4200.8 | 4252.6 | 3911.2 | 4066.4 | 4185.6 |

TABLE 5-continued

| Typical Properties | Test Method | Unit | 1 | 2 | 3 | 4 | 5 | 6 |
|---|---|---|---|---|---|---|---|---|
| Tensile Strength | ISO 527 | MPa | 71 | 79.8 | 79.1 | 73.5 | 82.9 | 83 |
| Tensile Elongation | ISO 527 | % | 3.27 | 3.09 | 2.91 | 3.6 | 3.29 | 3.09 |
| Notched IZOD Impact Strength | ASTM D256 | J/m | 145 | 103 | 53.2 | 121 | 86.2 | 94.2 |
| Unnotched IZOD Impact Strength | ASTM D4812 | J/m | 700 | 713 | 523 | 853 | 777 | 767 |
| MAI, total energy | ASTM D3763 | J | 23.6 | 10.1 | 6.18 | 22 | 15.3 | 5.86 |

The data in Table 5 demonstrate that addition of polyester in amounts ranging from about 5 wt % to about 30 wt % into 10% flat glass fiber filled BPA PC affords a drop in notch increase strength from 145 J/m to 53.2 J/m (sample #1-3). The unnotched impact strenght, tensile elongation and ball drop test show a decline to a different extent. Addition of polyester in amounts ranging from about 5 wt % to about 30 wt % into 10% round glass fiber filled BPA PC demonstrates a decrease in notch increase strength from 121 J/m to 94.2 J/m (sample #4-6).

The composition of samples #7-12 is detailed in Table 6.

TABLE 6

| Item Description | 7 | 8 | 9 | 10 | 11 | 12 |
|---|---|---|---|---|---|---|
| PC4 | 45.8 | 42.8 | 40.8 | 31.9 | 28.9 | 21.9 |
| PC3 | 18.4 | 18.4 | 18.4 | 12.3 | 12.3 | 12.3 |
| IM1 | 5 | 5 | 5 | 5 | 5 | 5 |
| PA | 0.01 | 0.01 | 0.01 | 0.01 | 0.01 | 0.01 |
| MR1 | 0.1 | 0.1 | 0.1 | 0.1 | 0.1 | 0.1 |
| TS1 | 0.5 | 0.5 | 0.5 | 0.5 | 0.5 | 0.5 |
| TS2 | 0.1 | 0.1 | 0.1 | 0.1 | 0.1 | 0.1 |
| FM1 | 0.1 | 0.1 | 0.1 | 0.1 | 0.1 | 0.1 |
| C1 | 0.5 | 0.5 | 0.5 | 0.5 | 0.5 | 0.5 |
| PBT1 |  | 3 | 5 |  | 3 | 10 |
| GF2 | 30 | 30 | 30 | 50 | 50 | 50 |
| TOTAL (wt %) | 100.51 | 100.51 | 100.51 | 100.51 | 100.51 | 100.51 |

The effect of polyester in 30% and 50% glass fiber filled BPA PC with polyester loading between 0-10% on samples #7-12 is shown in Table 7.

The data in Table 7 demonstrate that addition of polyester in amounts ranging from about 0 wt % to about 5 wt % into 30% glass fiber filled BPA PC affords an increase in both notched impact and unnotched impact (sample #1-3). The flow ability, as reflected by MVR and melt viscosity, also yields significant improvement. Addition of polyester in amounts ranging from about 0 wt % to about 10 wt % into 50% glass fiber filled BPA PC also affords a significant increase in both notched and unnotched impact (sample #4-6). Other properties, including modulus and strength, are maintained.

The composition of samples #13-15 is detailed in Table 8.

TABLE 8

| Item description | 13 | 14 | 15 |
|---|---|---|---|
| PC2 | 28.9 | 23.9 | 19.9 |
| PC1 | 12.3 | 12.3 | 12.3 |
| IM1 | 5 | 5 | 5 |
| PA | 0.01 | 0.01 | 0.01 |
| MR1 | 0.1 | 0.1 | 0.1 |
| TS1 | 0.5 | 0.5 | 0.5 |
| TS2 | 0.1 | 0.1 | 0.1 |
| FM1 | 0.1 | 0.1 | 0.1 |
| C1 | 0.5 | 0.5 | 0.5 |
| PBT1 | 3 | 8 | 12 |
| GF2 | 50 | 50 | 50 |
| Total (wt %) | 100.51 | 100.51 | 100.51 |

The effect of polyester in 50% glass fiber filled HFD PC with polyester loading between 3-12% on samples #13-15 is shown in Table 9.

TABLE 7

| Typical Properties | Test Method | Unit | 7 | 8 | 9 | 10 | 11 | 12 |
|---|---|---|---|---|---|---|---|---|
| MVR @ 300° C./1.2 Kg | ASTM D1238 | cm³/10 min | 11.3 | 13.6 | 16.6 | 5.04 | 7.03 | 8.69 |
| Notched IZOD Impact Strength | ASTM D256 | J/m | 187 | 186 | 197 | 166 | 166 | 206 |
| Unnotched IZOD Impact Strength | ASTM D4812 | J/m | 675 | 723 | 846 | 586 | 734 | 904 |
| Tensile Modulus | ASTM D638 | MPa | 8329.6 | 8797 | 8672.4 | 14297.6 | 14785.6 | 15149.2 |
| Tensile Strength | ASTM D638 | MPa | 115.8 | 124.4 | 123.8 | 159.2 | 163.8 | 167.8 |
| Tensile Elongation | ASTM D638 | MPa | 2.7 | 2.7 | 2.7 | 2.4 | 2.3 | 2.3 |
| Melt Viscosity @ 300° C. | 100.01 | Pa-s | 518.33 | 416.66 | 377.97 | 637.69 | 518.33 | 348.13 |
|  | 200 | Pa-s | 437.68 | 352.58 | 316.1 | 499.57 | 402.86 | 286.81 |
|  | 500 | Pa-s | 359.45 | 290.37 | 263.25 | 406.99 | 293.68 | 205.57 |
|  | 1000.01 | Pa-s | 278.37 | 229.15 | 205.5 | 314.68 | 228.6 | 158.85 |
|  | 1500 | Pa-s | 234.75 | 193.5 | 176.39 | 267.91 | 196.46 | 137.15 |
|  | 3000 | Pa-s | 166.74 | 137.46 | 127.51 | 190.95 | 143.53 | 106.9 |
|  | 5000 | Pa-s | 126.26 | 106.19 | 97.44 | 142.4 | 112.16 | 82.38 |
|  | 10000 | Pa-s | 81.32 | 69.77 | 66.15 | 94.45 | 75.64 |  |

TABLE 9

| Typical Properties | Test Method | Units | 13 | 14 | 15 |
|---|---|---|---|---|---|
| MVR @ 300 C./2.16 Kg | ASTM D1238 | cm$^3$/10 min | 8.73 | 10 | 11 |
| Tensile Modulus | ISO 527 | MPa | 14069.2 | 14676 | 14850.2 |
| Tensile Strength | ISO 527 | MPa | 147 | 153 | 161 |
| Tensile Elongation | ISO 527 | % | 2.2 | 2.2 | 2.3 |
| Notched IZOD Impact Strength | ASTM D256 | J/m | 179 | 214 | 233 |
| Unnotched IZOD Impact Strength | ASTM D4812 | J/m | 655 | 854 | 951 |
| Notched Charpy Impact Strength | ISO 179 | kJ/m2 | 17.05 | 18.27 | 21.61 |
| Unnotched Charpy Impact Strength | ISO 179 | kJ/m2 | 44.32 | 47.21 | 66.34 |

The data in Table 9 demonstrate that addition of polyester in amounts ranging from about 3 wt % to about 12 wt % into 50% glass fiber filled HFD PC affords an increase in notched impact from 179 J/m to 233 J/m and an increase in unnotched impact from 655 J/m to 851 J/m. An increase in MVR is also observed.

The composition of samples #16 and 17 is detailed in Table 10.

TABLE 10

| Item Description | 16 | 17 |
|---|---|---|
| PC2 | 10 | 10 |
| PC1 | 23.2 | 16.2 |
| PC-PS1 | 8 | 8 |
| PA | 0.01 | 0.01 |
| FM1 | 0.1 | 0.1 |
| MR1 | 0.5 | 0.5 |
| TS1 | 0.1 | 0.1 |
| TS2 | 0.1 | 0.1 |
| C1 | 0.5 | 0.5 |
| FR1 | — | — |
| PBT1 | 8 | 15 |
| GF2 | 50 | 50 |
| Total (wt %) | 100.51 | 100.51 |

The effect of polyester in 50% glass fiber filled HFD PC containing EXL with polyester loading between 8-15% on samples #16 and 17 is shown in Table 11.

TABLE 11

| Parameter | Test Method | Unit | 16 | 17 |
|---|---|---|---|---|
| MVR @ 300° C./2.16 Kg | ASTM 1238 | cm$^3$/10 min | 19.6 | 23.9 |
| Notched IZOD Impact Strength | ASTM D256 | J/m | 158 | 194 |
| Unnotched IZOD Impact Strength | ASTM D4812 | J/m | 628 | 888 |
| Notched Charpy Impact Strength | ISO 179 | kJ/m2 | 14.18 | 19.42 |
| MAI, total energy | ASTM D3763 | J | 28.7 | 28.3 |
| Tensile Modulus | ASTM D638 | MPa | 15512.8 | 15655.8 |
| Tensile Strength | ASTM D638 | MPa | 162.4 | 167 |
| Tensile Elongation | ASTM D638 | MPa | 2.1 | 2.2 |
| Melt Viscosity @ 300° C. | 100.01 | Pa-s | 322.71 | 266.35 |
| | 200 | Pa-s | 255.31 | 197.29 |
| | 500 | Pa-s | 206.9 | 160.26 |
| | 1000.01 | Pa-s | 164.61 | 121.08 |
| | 1500 | Pa-s | 144.33 | 110.56 |
| | 3000 | Pa-s | 114.21 | 83.12 |
| | 5000 | Pa-s | 91.74 | 66.38 |

The data in Table 11 demonstrate that addition of polyester in amounts ranging from about 8 wt % to about 15 wt % into 50% glass fiber filled HFD PC containing EXL affords an increase in notched impact from 158 J/m to 194 J/m and an increase in unnotched impact from 628 J/m to 888 J/m. An increase in MVR is also observed.

The composition of samples #18-20 is detailed in Table 12.

TABLE 12

| Item Description | 18 | 19 | 20 |
|---|---|---|---|
| PC4 | 12.2 | 10.5 | 8.8 |
| PC3 | 24.4 | 21.1 | 17.8 |
| PC-PS1 | 6 | 6 | 6 |
| TSAN | 0.6 | 0.6 | 0.6 |
| MR1 | 0.6 | 0.6 | 0.6 |
| TS1 | 0.1 | 0.1 | 0.1 |
| TS2 | 0.1 | 0.1 | 0.1 |
| FR1 | 6 | 6 | 6 |
| PBT1 | | 5 | 10 |
| GF2 | 50 | 50 | 50 |
| Total (wt %) | 100 | 100 | 100 |

The effect of polyester in 50% glass fiber filled BPA PC with the existence of phosphazene with polyester loading between 0-10% on samples #18-20 is shown in Table 13.

TABLE 13

| Typical Properties | Test Method | Units | 18 | 19 | 20 |
|---|---|---|---|---|---|
| MVR @ 300° C./1.2 Kg | ASTM 1238 | cm$^3$/10 min | 19.9 | 38.2 | 50.7 |
| Notched IZOD Impact Strength | ASTM D256 | J/m | 140 | 141 | 176 |
| Unnotched IZOD Impact Strength | ASTM D4812 | J/m | 649 | 683 | 1020 |
| Tensile Modulus | ASTM D638 | MPa | 15934.4 | 16394.2 | 16433 |
| Tensile Strength | ASTM D638 | MPa | 166 | 181.8 | 174.2 |
| Tensile Elongation | ASTM D638 | % | 2.4 | 2.4 | 2.4 |
| Notched Charpy Impact Strength | ISO 179 | KJ/m$^2$ | 13.93 | 14.48 | 17.86 |
| Unnotched Charpy Impact Strength | ISO 179 | KJ/m$^2$ | 46.7 | 54.99 | 60.18 |

The data in Table 13 demonstrate that addition of polyester in amounts ranging from about 0 wt % to about 10 wt % into 50% glass fiber filled BPA PC with the existence of phosphazene can yield an increase in notched impact from 140 J/m to 176 J/m and an increase in unnotched impact from 649 J/m to 1020 J/m. An increase in MVR is also observed.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blended thermoplastic composition comprising:
   a. from about 30 wt % to about 75 wt % of a polycarbonate polymer;
   b. from about 1 wt % to about 15 wt % of a polyester polymer; and
   c. from greater than 30 wt % to about 60 wt % of a reinforcing filler;
   wherein the combined weight percent value of all components does not exceed about 100 wt %;
   wherein all weight percent values are based on the total weight of the composition; and
   wherein a molded sample of the blended thermoplastic composition has an unnotched Izod impact strength when determined in accordance with ASTM D4812 of at least about 15% greater than a reference composition comprising substantially the same proportions of the same polycarbonate polymer component and the same reinforcing fiber, in the absence of the polyester polymer.

2. The composition of claim 1, wherein the polycarbonate is a homopolymer.

3. The composition of claim 2, wherein the homopolymer comprises repeating units derived from bisphenol A.

4. The composition of claim 1, wherein the polycarbonate is a copolymer.

5. The composition of claim 4, wherein the copolymer comprises repeating units derived from sebacic acid or bisphenol A, or both.

6. The composition of claim 1, wherein the polycarbonate polymer is present in an amount from about 45 wt % to about 70 wt %.

7. The composition of claim 1, wherein the polyester polymer comprises polybutylene terephthalate or polyethylene terephthalate, or both.

8. The composition of claim 1, wherein the polyester polymer is present in an amount from about 3 wt % to about 15 wt %.

9. The composition of claim 1, further comprising a polycarbonate-polysiloxane copolymer.

10. The composition of claim 9, wherein the polycarbonate-polysiloxane copolymer comprises a polysiloxane block from about 5 wt % to about 30 wt % of the polycarbonate-polysiloxane copolymer.

11. The composition of claim 9, wherein the polycarbonate-polysiloxane is present in an amount greater than about 0 wt % to about 15 wt %.

12. The composition of claim 1, further comprising an impact modifier.

13. The composition of claim 12, wherein the impact modifier component comprises at least one acrylonitrile-butadiene-styrene (ABS) polymer, at least one bulk polymerized ABS (BABS) polymer, or at least one methyl methacrylate-butadiene-styrene (MBS) polymer.

14. The composition of claim 12, wherein the impact modifier is present is an amount greater than about 0 wt % to about 10 wt %.

15. The composition of claim 1, further comprising at least one flame retardant.

16. The composition of claim 15, wherein the at least one flame retardant is a phosphorus-containing flame retardant.

17. The composition of claim 16, wherein the phosphorus-containing flame retardant is an aromatic cyclic phosphazene compound.

18. The composition of claim 16, wherein the phosphorus-containing flame retardant comprises rescorcinol bis(diphenyl phosphate), resorcinol bis(dixylenyl phosphate), hydroquinone bis(diphenyl phosphate), bisphenol-A bis(diphenyl phosphate), 4,4'-biphenol bis(diphenyl phosphate), triphenyl phosphate, methylneopentyl phosphite, pentaerythritol diethyl diphosphite, methyl neopentyl phosphonate, phenyl neopentyl phosphate, pentaerythritol diphenyldiphosphate, dicyclopentyl hypodiphosphate, dineopentyl hypophosphite, phenylpyrocatechol phosphite, ethylpyrocatechol phosphate or dipyrocatechol hypodiphosphate, or a combination thereof.

19. The composition of claim 15, wherein the flame retardant is present in an amount from greater than about 0 wt % to about 15 wt %.

20. The composition of claim 1, further comprising at least one additive selected from an anti-drip agent, antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer, or combinations thereof.

21. The composition of claim 1, further comprising an anti-drip agent present in an amount from about 0.05 wt % to about 3 wt %.

22. The composition of claim 21, wherein the anti-drip agent is a styrene-acrylonitrile copolymer encapsulated polytetrafluoroethylene.

23. The composition of claim 21, wherein the antioxidant is a primary antioxidant, a secondary antioxidant, or combinations thereof.

24. The composition of claim 23, wherein the primary antioxidant is selected from the group consisting of a hindered phenol and secondary aryl amine, or a combination thereof.

25. The composition of claim 23, wherein the secondary anti-oxidant is selected from the group consisting of an organophosphate and thioester, or a combination thereof.

26. An article comprising the compositions of claim 1.

27. The article of claim 26, wherein the article is selected from the group consisting of a computer device, electromagnetic interference device, printed circuit, Wi-Fi device, Bluetooth device, GPS device, cellular antenna device, smart phone device, automotive device, medical device, sensor device, security device, shielding device, RF antenna device, LED device and RFID device.

28. A blended thermoplastic composition comprising:
   a. from about 30 wt % to about 75 wt % of a polycarbonate polymer;
   b. from about 1 wt % to about 15 wt % of a polyester polymer;
   c. from about 25 wt % to about 60 wt % of a reinforcing filler;
   d. from about 1 wt % to about 15 wt % of a flame retardant; and
   e. from about 1 wt % to about 15 wt % of an impact modifier polymer, wherein the impact modifier in not an acrylonitrile-butadiene-styrene (ABS) polymer;
   wherein the combined weight percent value of all components does not exceed about 100 wt %;
   wherein all weight percent values are based on the total weight of the composition;
   wherein the blended thermoplastic composition has a melt volume rate (MVR) when determined in accordance with ASTM 1238 at 300° C. under a load of 1.2 kg of at least about 10% greater than a reference composition comprising substantially the same proportions of the same polycarbonate polymer component and the same reinforcing fiber, in the absence of the polyester polymer; and wherein a molded sample of the blended thermoplastic composition has an unnotched Izod impact strength when determined in accordance with ASTM D4812 of at least about 15% greater than a reference composition comprising substantially the same proportions of the same polycarbonate polymer component and the same reinforcing fiber, in the absence of the polyester polymer.

29. A method of preparing a composition, comprising mixing:
   a. from about 30 wt % to about 75 wt % of a polycarbonate polymer;
   b. from about 1 wt % to about 15 wt % of a polyester polymer;
   c. from about 1 wt % to about 15 wt % of a flame retardant; and
   d. from about 30 wt % to about 60 wt % of a reinforcing filler;
   wherein the combined weight percent value of all components does not exceed about 100 wt %;
   wherein all weight percent values are based on the total weight of the composition;
   wherein the blended thermoplastic composition has a melt volume rate (MVR) when determined in accordance with ASTM 1238 at 300° C. under a load of 1.2 kg of at least about 10% greater than a reference composition comprising substantially the same proportions of the same polycarbonate polymer component and the same reinforcing filler, in the absence of the polyester polymer; and
   wherein a molded sample of the blended thermoplastic composition has an unnotched Izod impact strength when determined in accordance with ASTM D4812 of at least about 15% greater than a reference composition comprising substantially the same proportions of the same polycarbonate polymer component and the same reinforcing fiber, in the absence of the polyester polymer.

30. The method of claim 29, where mixing comprises the steps of:
   a. pre-blending from about 30 wt % to about 75 wt % of a polycarbonate polymer powder with from about 1 wt % to about 15 wt % of a flame retardant to provide a pre-blended polycarbonate polymer and flame retardant;
   b. feeding the pre-blended polycarbonate polymer and flame retardant into an extruder apparatus;
   c. compounding in the extruder apparatus the pre-blended polycarbonate polymer and flame retardant with from about 1 wt % to about 15 wt % of a polyester polymer; and
   in a downstream extruder zone feeding into the extruder apparatus from greater than 30 wt % to about 60 wt % of a reinforcing filler.

31. The composition of claim 1, wherein the reinforcing filler comprises glass beads, glass fiber, glass flakes, mica, talc, clay, wollastonite, zinc sulfide, zinc oxide, carbon fiber, ceramic-coated graphite, or titanium dioxide, or a combination thereof.

32. The composition of claim 1, wherein the reinforcing filler comprises glass fiber.

33. The composition of claim 32, wherein the glass fiber has a diameter from about 4 µm to about 15 µm.

34. The composition of claim 32, wherein the glass fiber is present in an amount from about 50 wt % to about 60 wt %.

* * * * *